(12) United States Patent
Janzen et al.

(10) Patent No.: US 12,061,879 B1
(45) Date of Patent: Aug. 13, 2024

(54) ACCESSING STORED CODE STRINGS FOR EXECUTION TO PRODUCE RESOURCES FOR DIVERSE SITUATIONS

(71) Applicant: Avalara, Inc., Seattle, WA (US)

(72) Inventors: Mark Janzen, Wichita, KS (US); Gregory T Kavounas, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 368 days.

(21) Appl. No.: 17/564,182

(22) Filed: Dec. 28, 2021

Related U.S. Application Data

(60) Provisional application No. 63/240,079, filed on Sep. 2, 2021.

(51) Int. Cl.
- *G06F 8/30* (2018.01)
- *G06F 16/245* (2019.01)
- *G06Q 20/20* (2012.01)

(52) U.S. Cl.
CPC .............. *G06F 8/30* (2013.01); *G06F 16/245* (2019.01); *G06Q 20/207* (2013.01)

(58) Field of Classification Search
None
See application file for complete search history.

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,620,578 B1 | 12/2013 | Brown et al. | |
| 8,725,407 B2 | 5/2014 | Hurley et al. | |
| 9,760,915 B2 | 9/2017 | Pavlou et al. | |
| 10,332,216 B2 | 6/2019 | Barsade et al. | |
| 10,445,818 B1 | 10/2019 | Chowdhary | |
| 10,769,611 B2 | 9/2020 | McNeel | |
| 10,872,100 B1 | 12/2020 | Shefferman et al. | |
| 11,176,620 B1 | 11/2021 | Lubczynski et al. | |
| 11,238,542 B1 | 2/2022 | Wixted et al. | |
| 2002/0138765 A1 | 9/2002 | Fishman et al. | |
| 2007/0136158 A1 | 6/2007 | Rawlings et al. | |
| 2007/0136159 A1 | 6/2007 | Rawlings et al. | |
| 2009/0187500 A1 | 7/2009 | Wilson et al. | |
| 2013/0013471 A1 | 1/2013 | Fishman | |
| 2013/0061208 A1* | 3/2013 | Tsao | G06F 9/44 717/121 |

(Continued)

*Primary Examiner* — Qing Chen
(74) *Attorney, Agent, or Firm* — Nicholson, De Vos, Webster & Elliott, LLP

(57) ABSTRACT

A software configuration includes to store, in a strings memory, combinations of possible source locations and of possible destination locations that are subject to rules pairwise, and to further store respective code strings in association with the respective combinations. The possible locations may be stored by alphanumeric designators, for convenience in looking up the code strings. These code strings may be in a form that is mostly alphanumeric, may embed numerical parameters, and may even represent numerical operations. In fact, a code string of this type may even be configured in the form of code which, upon being executed, implements the rule that is applicable to the combination of the code string's source location and their destination location. The looked-up code string, or a code module generated from it, may then indeed be executed, to produce a resource that complies with the applicable rule.

38 Claims, 23 Drawing Sheets

(56) References Cited

U.S. PATENT DOCUMENTS

| | | |
|---|---|---|
| 2014/0172656 A1 | 6/2014 | Shaw |
| 2014/0351105 A1 | 11/2014 | Hamm |
| 2016/0042466 A1 | 2/2016 | Herndon et al. |
| 2016/0140668 A1 | 5/2016 | Maguire et al. |
| 2019/0114609 A1 | 4/2019 | Burton et al. |
| 2021/0158456 A1 | 5/2021 | Morgan et al. |
| 2021/0303279 A1* | 9/2021 | Bird .................. G06F 8/751 |

* cited by examiner

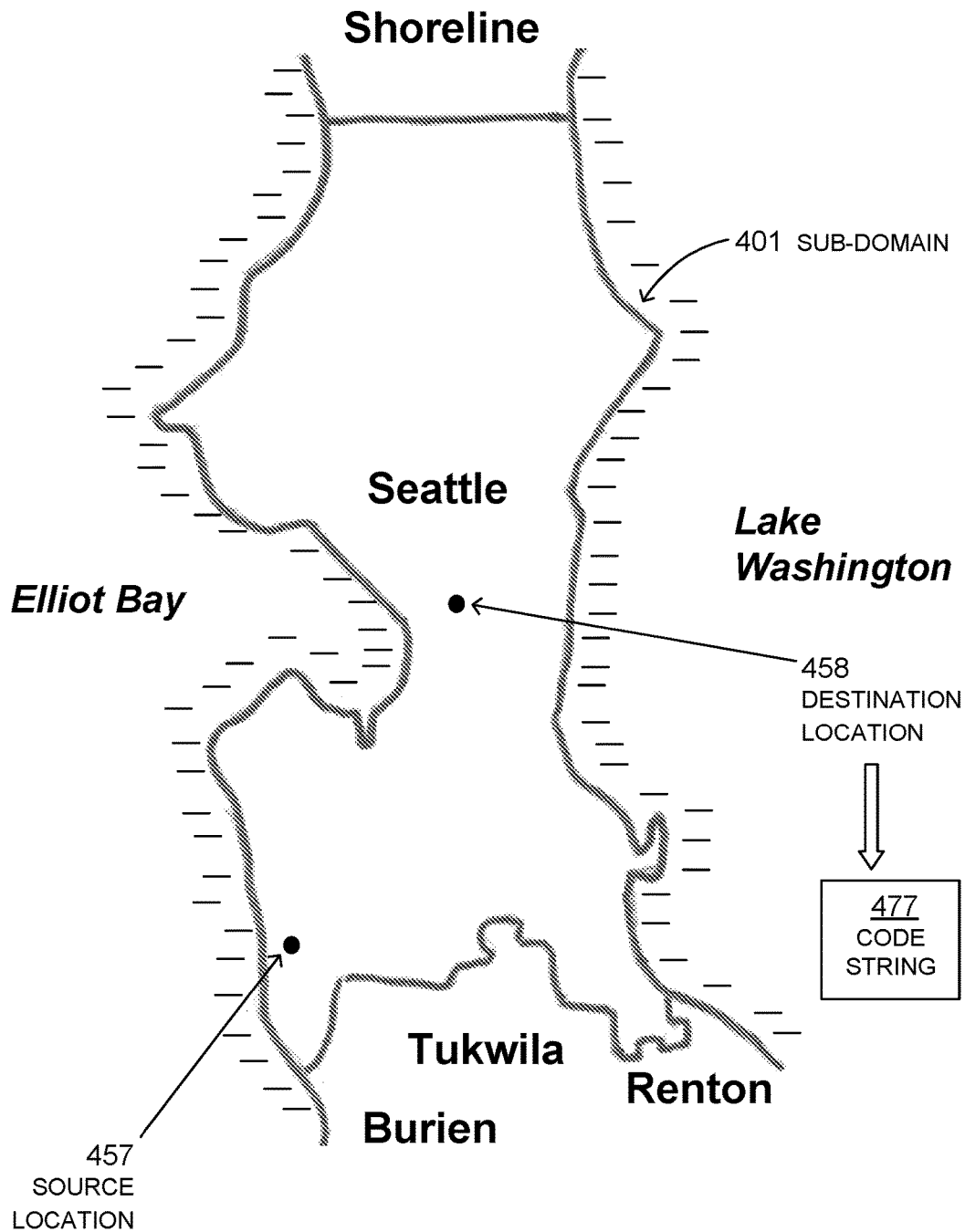
FIGURE 4A  *MAP OF CITY OF SEATTLE CONSIDERED AS DOMAIN*

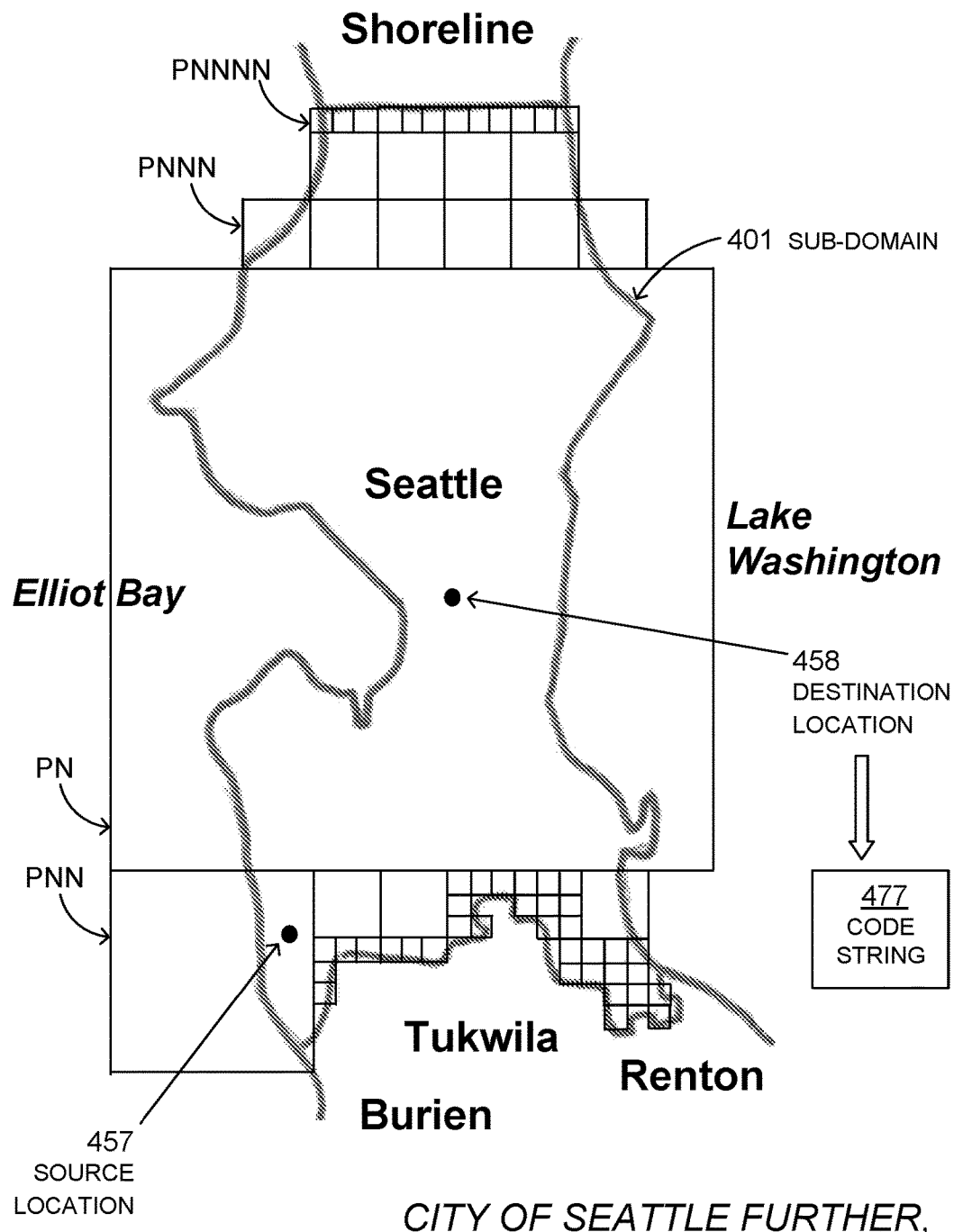
FIGURE 4B — *CITY OF SEATTLE FURTHER, PARTITIONLED IN LOCATION CODE TILES FINDABLE BY LOCATION LOOKUP CODES – INITIAL 4L APPROXIMATION*

*SAMPLE LOCATION LOOKUP CODE NUMBERING SCHEME, WITH MINIMIZED NUMBER OF DIGITS*

*SAMPLE LOCATION LOOKUP CODE NUMBERING SCHEME, WITH LEADING ZEROES*

*SAMPLE LOCATION LOOKUP CODE NUMBERING SCHEME, WITH TRAILING ZEROES*

SAMPLE LOCATION LOOKUP CODE NUMBERING SCHEME, WITH LEADING NUMBER INDICATING LENGTH

SAMPLE CODE MODULE WITH LOGICAL "IF" STATEMENT, EXECUTED BY MICROSOFT(R) EXCEL(R)

| 1677 CODE STRING CSA | IF(BV>3500, BV*0.08, BV*0.04) |
| --- | --- |
| 1604 CODE KERNEL A | IF(BV>3500, BV*0.08, BV*0.04) |
| 1605 CODE MODULE A | =IF(BV>3500, BV*0.08, BV*0.04) |

*SAMPLE GENERATION OF CODE MODULE*

*EXECUTING IN CONJUNCTION WITH THE BASE VALUE*

FIGURE 22  *METHODS*

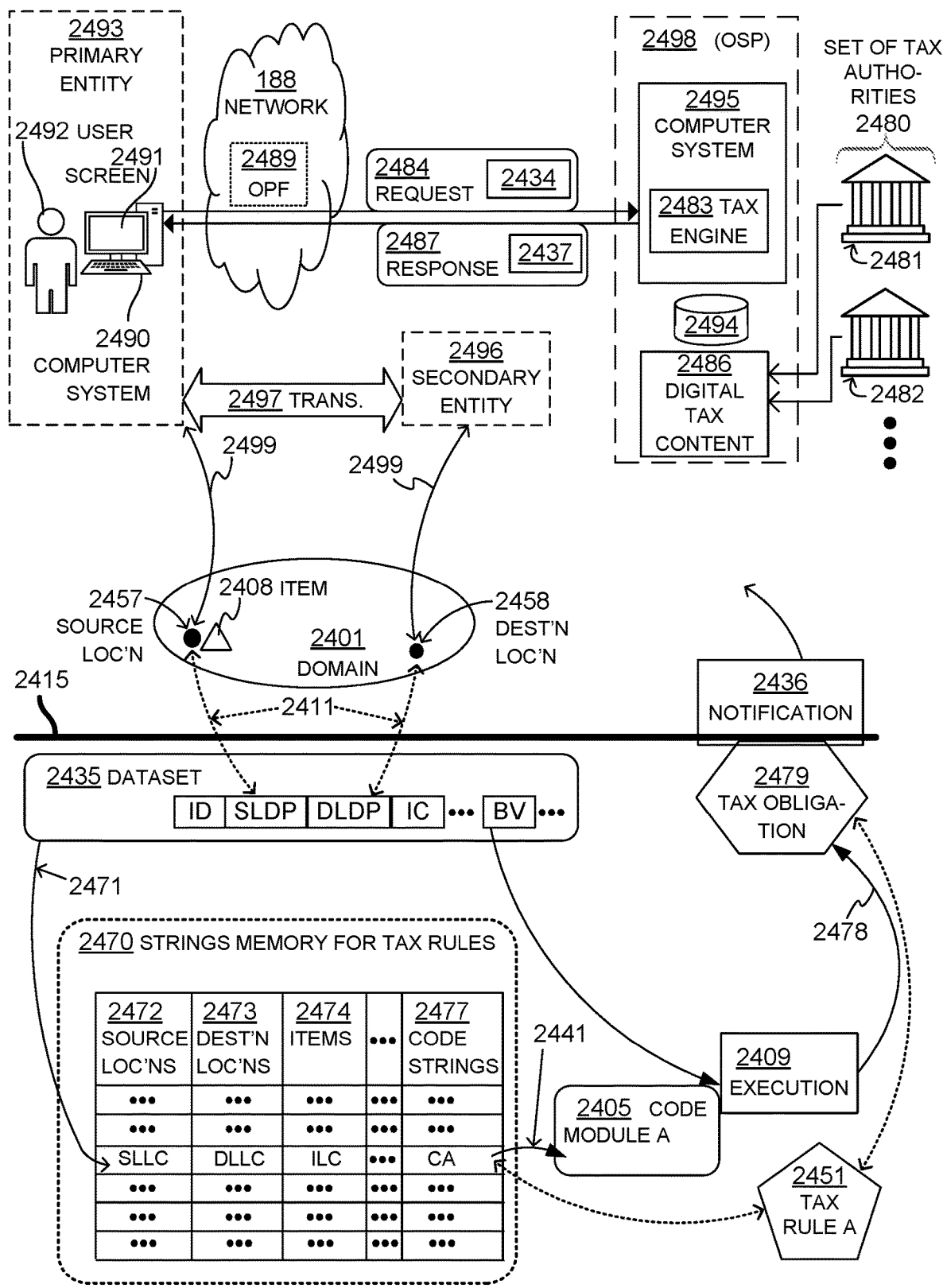
FIGURE 24 — USE CASE

2500

2510 RECEIVE FROM THE SELLER DATASET REPRESENTING SALES TRANSACTION

2520 PARSE FROM THE DATASET, A BASE VALUE I) A SELLER LOCATION, II) A BUYER LOCATION, AND III) AN ITEM CODE

2530 CAUSE:

2540 ... TO BE ACCESSED A STRINGS MEMORY THAT STORES CODE STRINGS

2550 ... A CODE STRING TO BE LOOKED UP FROM THE STRINGS MEMORY, THE CODE STRING ASSOCIATED WITH THE SELLER LOCATION, II) THE BUYER LOCATION, AND III) THE ITEM, THE CODE STRING CONFIGURED TO IMPLEMENT A SALES TAX RULE

2570 ... TO BE COMPUTED, BY EXECUTING THE CODE STRING, A SALES TAX DUE THAT COMPLIES WITH THE SALES TAX RULE

2580 CAUSE A NOTIFICATION ABOUT THE SALES TAX DUE TO BE TRANSMITTED OVER THE NETWORK TO THE SELLER

FIGURE 25  *METHODS*

ACCESSING STORED CODE STRINGS FOR EXECUTION TO PRODUCE RESOURCES FOR DIVERSE SITUATIONS

CROSS REFERENCE TO RELATED PATENT APPLICATIONS

This patent application claims priority from U.S. provisional patent application Ser. No. 63/240,079, filed on Sep. 2, 2021.

BACKGROUND

Providing, in a timely and efficient manner, accurate and reliable production of resources presents a technical problem for current ERP applications. Computations may be performed that implement rules, but the rules need to look up parameter values that would be different in diverse situations at run time, which presents the problem that the production of resources consumes a lot of time.

BRIEF SUMMARY

The present description gives instances of software configurations, computer systems, storage media that may store programs, and methods.

In embodiments, a software configuration includes to store, in a strings memory, combinations of possible source locations and of possible destination locations that are subject to rules pairwise, and to further store respective code strings in association with the respective combinations. The possible locations may be stored by alphanumeric designators, for convenience in looking up the code strings. These code strings may be in a form that is mostly alphanumeric, may embed numerical parameters, and may even represent numerical operations. In fact, a code string of this type may even be configured in the form of code which, upon being executed, implements the rule that is applicable to the combination of the code string's source location and their destination location. The looked-up code string, or a code module generated from it, may then indeed be executed, to produce a resource that complies with the applicable rule.

Such software configurations can be implemented in use cases discussed later in this document. By storing a code string that is executable, and which already has numerical values for its parameters, time is saved from having to look up the values of the parameters for the diverse situations for producing each resource. In fact, the improvements in performance time can even be an order of magnitude. As such, the present disclosure provides configurations, systems, computer-readable media, and methods that solve these technical problems by increasing the speed of specialized software platforms and computer networks, and thus improving the technology of ERP software applications.

Therefore, the systems and methods described herein for selected resource production improve the functioning of computers or other hardware, by reducing the processing, storage, and/or data transmission resources needed to perform various tasks in real time, and thereby enabling the tasks to be performed by less capable, capacious, and/or expensive hardware devices, enabling the tasks to be performed with less latency and/or preserving more of the conserved resources for use in performing other tasks or additional instances of the same task.

As such, it will be appreciated that results of embodiments are larger than the sum of their individual parts, and have utility.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 4A is a map of the City of Seattle, where a sample source location and a sample destination location are also shown, along with an associated sample code string, according to embodiments.

FIG. 4B is the map of FIG. 4A, which further has been partitioned in location code tiles to a four-level approximation, for generating location lookup codes, according to embodiments.

FIG. 24 is a diagram of sample aspects for describing operational examples and use cases of embodiments.

FIG. 25 is a flowchart for illustrating sample methods according to embodiments.

DETAILED DESCRIPTION

As has been mentioned, the present description is about software configurations, computer systems, storage media that may store programs, and methods. Embodiments are now described in more detail.

Figure 1:
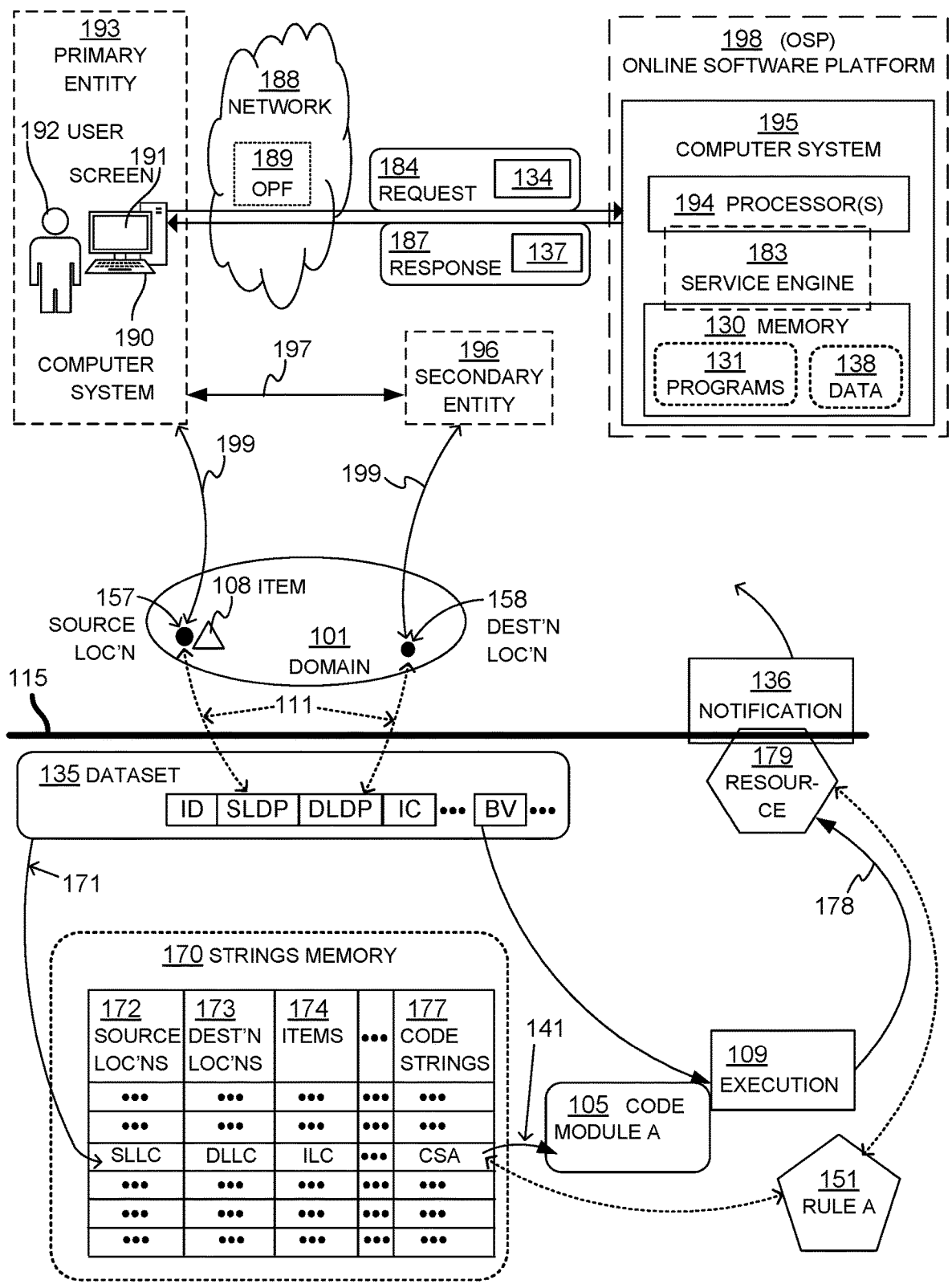
FIG. 1 is a diagram showing sample aspects of embodiments.

FIG. 1 is a diagram showing sample aspects of embodiments. A thick line 115 separates this diagram, although not completely or rigorously, into a top portion and a bottom portion. Above the line 115 the emphasis is mostly on entities, components, their relationships, and their interactions, while below the line 115 the emphasis is mostly processing of data that takes place often within one or more of the components above the line 115.

Above the line 115, a sample computer system 195 according to embodiments is shown. The computer system 195 has one or more processors 194 and a memory 130. The memory 130 stores programs 131 for running on the one or more processors 194, and data 138. The memory 130 may include designated portions for specific types of data 138, for example the memory 130 may include one or more records memories designated for certain types of records designated by clients, by rules, by types of data and so on. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an online software platform (OSP) 198. The OSP 198 can be configured to perform one or more predefined services, for example via operations of the service engine 183. Such services can be searches, determinations, computations, verifications, notifications, the transmission of specialized information, including data that effectuates payments, portions of code as data, code modules as data, the generation and transmission of documents, the online accessing other systems to effect registrations, and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity 193, which can be referred to also merely as entity. In such instances, the user 192 can be an agent of the entity 193, and even within a physical site of the entity 193, although that is not necessary. In embodiments, the computer system 190 or other device of the user 192 or the entity 193 are client devices for the computer system 195.

The computer system 190 may access the computer system 195 via a communications network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then parse the payload 134 to determine what is a requested resource as described below in more detail, produce the requested resource 179, form a payload 137 that is an aspect of the resource 179, and then push, send, or otherwise cause to be transmitted a response 187 that carries the payload 137 to the connector. The connector reads the response 187, and forwards the payload 137 to the certain application. The resource 179 may be an only resource, or a first requested resource, and so on.

In an alternative such architecture, a device remote to the service engine 183, such as the computer system 190, may have a particular application (not shown). In addition, the computer system 195 implements a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 produces the requested resource 179, and sends an aspect of it back to the REST API. In turn, the REST API sends the response 187 that has the payload 137 to the particular application.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the primary entity 193 may have instances of relationships with secondary entities. Only one such secondary entity 196 is shown. In this example, the primary entity 193 has a relationship instance 197 with the secondary entity 196.

In some instances, the user 192 or the primary entity 193 may have data about one or more of the secondary entities, for example via relationship instances with them. The primary entity 193 and/or the secondary entity 196 may be referred to as simply entities. One of these entities may have one or more attributes. Such an attribute of such an entity may be any one of its name, type of entity, a place within a domain, a physical or geographical location such as an address, a contact information element, an affiliation, a characterization of another entity, a characterization by another entity, an association or relationship, ongoing or just relationship instances, with another entity, an asset of the entity, a declaration by or on behalf of the entity, and so on. Examples are now described.

A domain 101 is shown above the line 115. Within the domain 101 there are shown a source location 157 and a destination location 158. The source location 157 and the destination location 158 can be defined within the domain 101 by a respective source location datapoint and a destination location datapoint, as described later in this document. While the source location 157 and the destination location 158 are shown within the single domain 101, such is not required; indeed, each can be in its own domain, or subdomain, and so on. In some embodiments, a single domain is selected that includes both the source location and the destination location.

In addition, an item 108 is shown at the source location 157. But that is for this example only, and the item 108 could instead be at the destination location 158, or in transit from one to the other, and so on. The item 108 is thus, in this example, shown within the domain 101.

The domain 101 may have two dimensions. For instance, the domain can be geographic. An example is now described.

Figure 2:
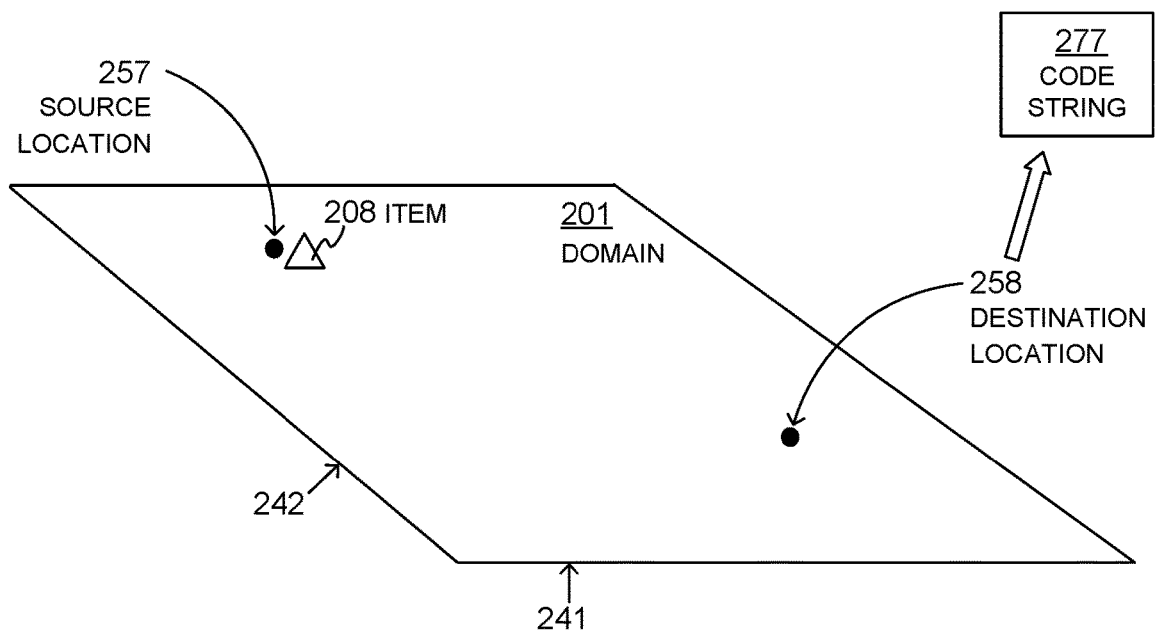
FIG. 2 shows a perspective view of a sample two-dimensional domain, a sample source location and a sample destination location within the domain, a sample item associated with the sample source location, and a sample code string, according to embodiments.

Referring now to FIG. 2, a domain 201 is a two-dimensional version of the domain 101. Lines 241, 242 are provided for perspective, but are not necessarily edges or boundaries of the domain 201. The view of FIG. 2 is a perspective view, in that the lines 241, 242 could be perpendicular with respect to each other—at least within a locale—when seen in a plane that they define, but that plane is not the plane of the drawing sheet. In such cases, the lines 241, 242 could further be orthogonal axes, but that is not necessary.

A source location 257 and a destination location 258 are shown within the domain 201. A source location datapoint and a destination location datapoint may define the source location 257 and the destination location 258, respectively, within the domain 201. For instance, when the lines 241, 242 are orthogonal axes, such datapoints could be defined in terms of coordinate values with respect to these axes. Other ways of defining the datapoints are also possible, as described later in this document.

A sample item 208 is also shown as associated with the sample source location 257. As mentioned previously, this association is shown like this for convenience only, for the moment only, and is not required.

In embodiments, a code string 277 may be associated with one or more of i) the defined source location 257, ii) the defined destination location 258, and iii) the item 208. Here only the association with the destination location 258 is shown, but this is only a non-limiting example. Additional information about code strings, such as the code string 277 and code strings 377, 477, 577, 677, 777 and 877, is provided later in this document.

The domain 101 may have three or more dimensions. For instance, the domain can be geographic, but differentiate further for different altitudes at different locations. An example is now described.

Figure 3:
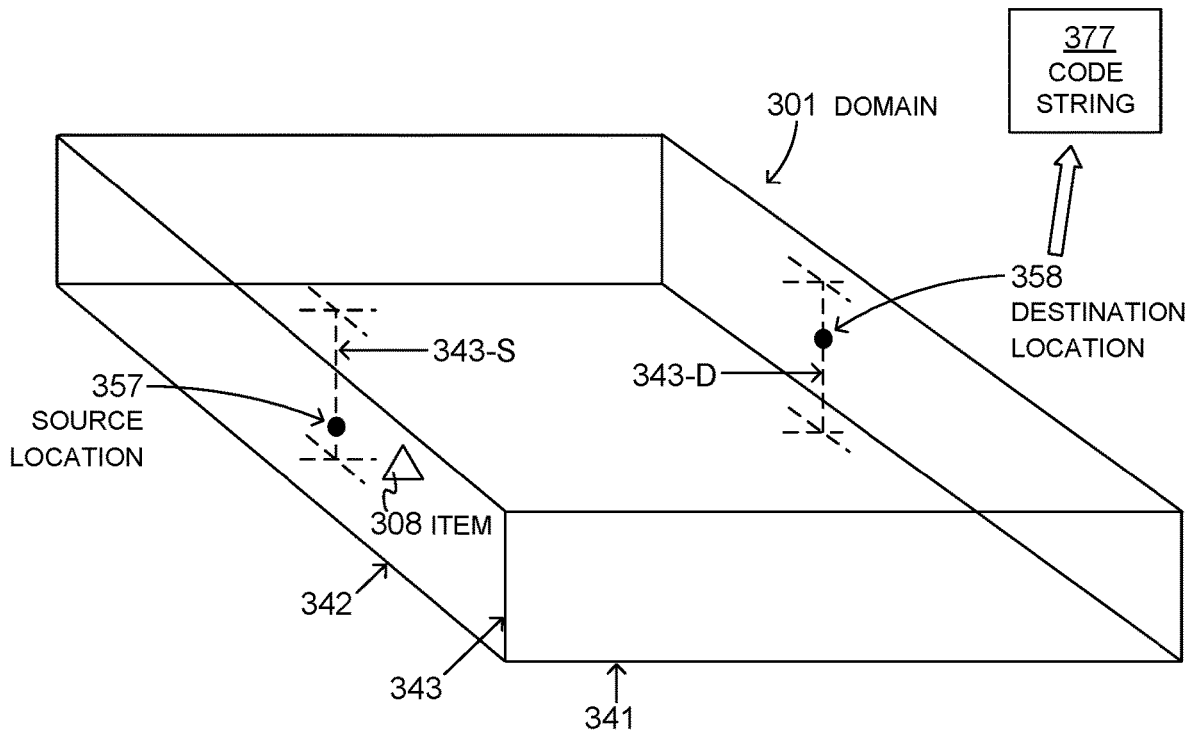
FIG. 3 shows a perspective view of a sample three-dimensional domain, a sample source location and a sample destination location within the domain, a sample item associated with the sample source location and a sample code string, according to embodiments.

Referring now to FIG. 3, a domain 301 is a three-dimensional version of the domain 101. Lines 341, 342, 343 are provided for perspective, but are not necessarily edges or boundaries of the domain 301. The view of FIG. 3 is a perspective view, in that the lines 341, 342, 343 could be perpendicular with respect to each other—at least within a locale—when seen in the volume that they define. In such cases, the lines 341, 342, 343 could further be orthogonal axes, but that is not necessary.

A source location 357 and a destination location 358 are shown within the domain 301. A source location datapoint and a destination location datapoint may define the source location 357 and the destination location 358, respectively, within the domain 301. For instance, when the lines 341, 342, 343 are orthogonal axes, such datapoints could be defined in terms of coordinate values with respect to these axes. In particular, for the source location 357 a line segment 343-S is also shown, which is parallel to the line 343. And, for the destination location 358 a line segment 343-D is also shown, which is parallel to the line 343.

A sample item 308 is also shown as associated with the sample source location 357. As mentioned previously, this association is shown like this for convenience only, for the moment only, and is not required.

In embodiments, a code string 377 may be associated with one or more of i) the defined source location 357, ii) the defined destination location 358, and iii) the item 308. Here only the association with the destination location 358 is shown, but this is only a non-limiting example.

Aspects of describing location datapoints are now described.

FIG. 4A shows a sample two-dimensional sub-domain 401 that is the City of Seattle. The sub-domain 401 may be part of a larger domain that is the State of Washington, or the United States of America.

From FIG. 4A, on the West the City of Seattle is bounded by a body of water, namely Elliot Bay. On the East, the City of Seattle is bounded by another body of water, namely Lake Washington. On the North, the City of Seattle is bounded by the City of Shoreline. On the South, the City of Seattle is bounded by the Cities of Burien, Tukwila and Renton, whose individual boundaries are not shown.

A source location 457 and a destination location 458 are shown within the sub-domain 401. Moreover, a code string 477 may be associated with one or more of i) the defined source location 457 and ii) the defined destination location 458. Here only the association with the destination location 458 is shown, but this is only a non-limiting example.

Various locations in the City of Seattle have mailing addresses. As such, at least one of the source location datapoint and the destination location datapoint may include a street address for, respectively, at least one of the source location 457 and the destination location 458.

Locations in the City of Seattle may be defined by a latitude and a longitude. As such, at least one of the source location datapoint and the destination location datapoint may include a latitude and a longitude for, respectively, at least one of the source location 457 and the destination location 458.

In embodiments, locations in the City of Seattle may be defined by location lookup codes. In particular, at least one of the source location datapoint and the destination location datapoint is a location lookup code.

Such location lookup codes can be numerical, alphabetical, alphanumeric, and so on. Such location lookup codes can be implemented in a number of ways. Embodiments are now described.

For instance, a location lookup code could be of the format: CCC.SS.RRR.NNN.MMM, where CCC is code for Country such as USA, SS is code for State or province within the Country such as WA for Washington State, RRR is code for Region within the State such as Seattle Metropolitan Area, NNN is code for Neighborhood or rural area within the Region, MMM a street or cross street or route number and mile number designation, and so on, in this example getting more and more local when going from left to right. This format would use preexisting divisions of a domain.

In embodiments, location lookup codes, and defining datapoints for the source locations and the destination location, can be performed by partitioning a domain into segments or tiles, and then numbering these segments or tiles. Partitioning can be in any way, and tiles within a single domain can be any shape or size. Preferably tiles are rectangular, and even square. Of course, this is understood in terms of the values of the longitude and latitude, when in fact the line of a geographical square tile closer to the equator is longer than its opposite line, due to the curvature of the earth. In embodiments, a domain is partitioned according to a partitioning scheme, and the location lookup codes follow the partitioning scheme, as they describe each tile. Examples are now described.

FIG. 4B is the map of FIG. 4A, which further has been partitioned into location code tiles according to a partitioning scheme. The partitioning scheme includes that the tiles are square, and each tile maybe subdivided into nine smaller tiles, and so on.

A large tile PN covers much of the center of the City of Seattle, and also the destination location 458. In this example, the "P" of the PN can be a set of digits that locates the large tile PN within the sub-domain 401. So, P will be the same for all the tiles within the sub-domain 401. The "N" of the PN a further specifying digit. In this case, N might be just the number 1. In such a case, a location lookup code for the destination location 458 is simply PN, or P1.

The partitioning can be performed to define different locations in an area as much as is desired and possible. More partitioning will give finer resolution for boundaries or locations that matter with increased accuracy, but at the cost of increasing the burden of producing resources. Notably, in this example, the tile PN includes bodies of water, in particular Elliot Bay to the West and Lake Washington to the East. Even if neither the source location 457 nor the destination location 458 could validly be in water, in embodiments this is not a problem as portions of a tile may be formally defined as valid, but such portions may never be actually used. Where, however, boundaries or locations are encountered that matter, a tile may be further divided into tiles according to one more level of refinement, and so on.

In the particular example of FIG. 4B, the partitioning is four levels deep. In addition to the PN tile at the center, at the lower left another tile PNN is shown. The tile PNN is one level deeper approximation, and equals ⅑th the size of the PN tile. The tile PNN has two numbers N following the prefix P, which reflects the increased resolution.

A deeper, third approximation is tiles PNNN, each of which is ⅑th the size of the tile PNN. An even deeper, fourth approximation is tiles PNNNN, each of which is ⅑th the size of the tile PNNN. As such, the partitioning of FIG. 4B stops at the fourth level ("4L"), although that is not necessary. This may still produce resources inaccurately for a few locations at the boundary, for example the southern boundary. Partitioning may continue to deeper levels, until the inaccuracies are tolerable for the purposes of applications.

The partitioning scheme of FIG. 4B is to further partition or subdivide each tile into 3×3=9 smaller tiles. There is no requirement that a) square tiles be used, b) the division be into 3×3 smaller tiles, and so on.

Where the division is into 3×3=9 smaller tiles, a benefit is that there are enough single numbers among 0, 1, 2, . . . , 9 for using as the N of the PN, and therefore N can be kept into be a single number. Similarly, if each tile is subdivided into 5×5=25 smaller tiles, there are enough letters among the 26 letters of the English alphabet A, B, C, . . . , Z, and therefore N can be kept into be a single letter. And, if each tile is subdivided into 6×6=36 smaller tiles, there are enough alphanumeric characters from both the single-digit numbers and the letters of the English alphabet, and therefore N can be kept into be a single alphanumeric character.

Examples are now provided for different numbering schemes of the tiles. In all of these examples the partitioning scheme is to subdivide, only as necessary from other considerations, each tile into 3×3=9 smaller tiles, which permits only numbers to be used to differentiate the subdivided tiles among each other. In all of these examples, the subdivision is three levels (3L) deep, namely into high, medium and low. Plus, these examples are presented for both the source location datapoint and the destination location datapoint. And, for all these examples, the number assigned by the numbering scheme to a tile can be a source location datapoint, a destination source location datapoint, or even a source location lookup code, a destination location lookup code, and so on.

Figure 5:
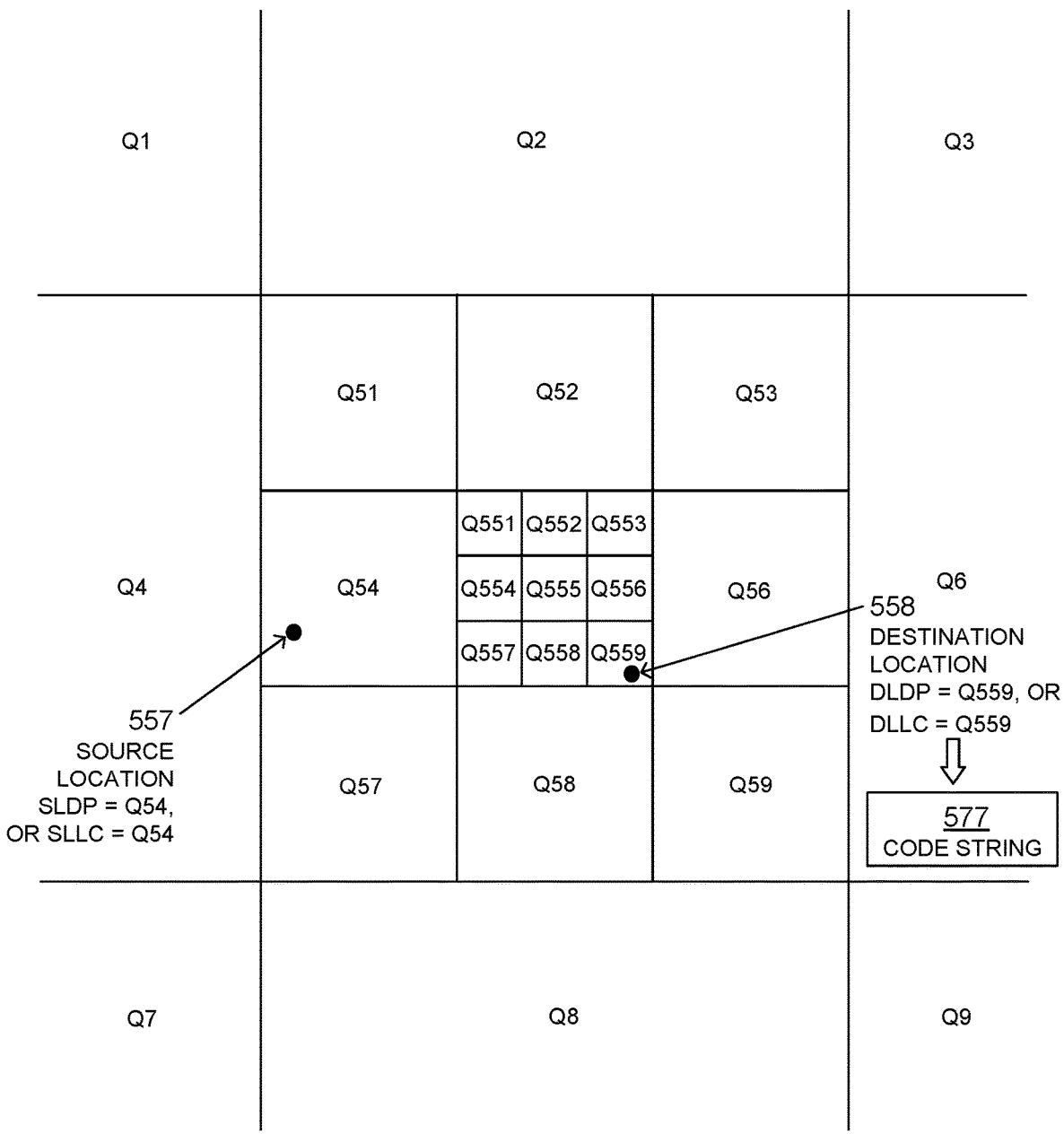
FIG. 5 is a diagram of a sample domain, a sample source location and a sample destination location within the domain, a sample code string, and in which the domain has been partitioned into tiles that have a first sample numbering scheme, according to embodiments.

FIG. 5 is provided for explaining a first numbering scheme. FIG. 5 shows a domain 501, with a source location 557 and a destination location 558. It also shows a code string 577 that is associated with the destination location 558.

In the vicinity of the source location 557 and the destination location 558, the domain 501 has been partitioned, at the high level, into nine tiles Q1, Q2, ..., Q9. In this example, Q can be a set of digits for that vicinity, common for all numbers of the locations in the page.

In addition, the tile Q5 is partitioned or subdivided at the next deeper level, the medium level, into nine tiles Q51, Q52, ..., Q59. It will be observed that the source location 557 is within the tile Q54. As such, the source location datapoint SLDP=Q54 can be used to define where the source location 557 is, within the domain 501. This first numbering scheme could be used also for lookup codes, in which case a source location lookup code for the source location 557 would be SLLC=Q54.

Moreover, the tile Q55 is further partitioned or subdivided at the next deeper level, the low level, into nine tiles Q551, Q552, ..., Q559. It will be observed that the destination location 558 is within the tile Q559. As such, the destination location datapoint DLDP=Q559 can be used to define where the destination location 558 is, within the domain 501. Plus, per the above, a destination location lookup code DLLC=Q559 can be used for the destination location 558.

Figure 6:
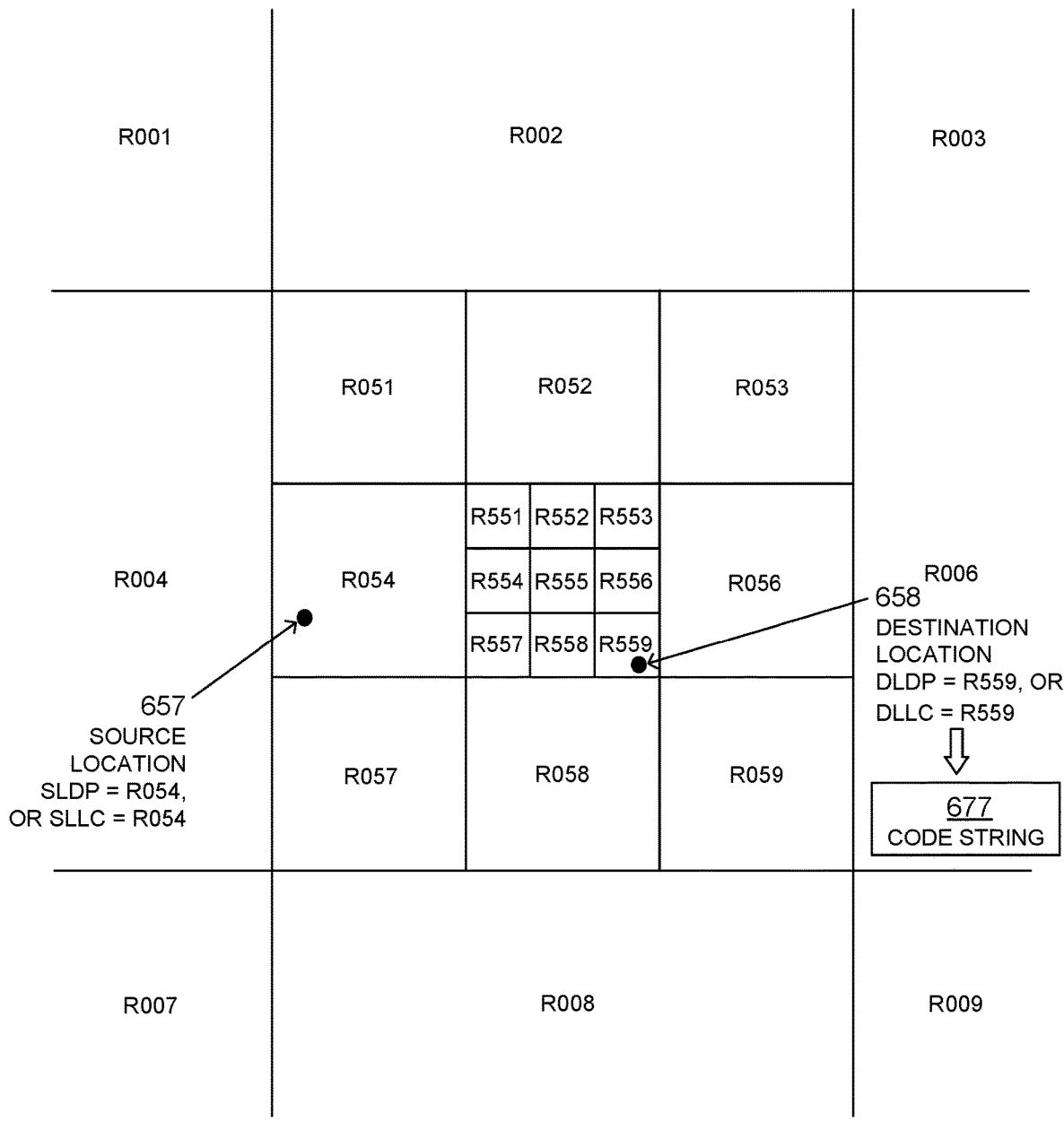
FIG. 6 is a diagram of a sample domain, a sample source location and a sample destination location within the domain, a sample code string, and in which the domain has been partitioned into tiles that have a second sample numbering scheme, according to embodiments.

FIG. 6 is provided for explaining a second numbering scheme. FIG. 6 shows a domain 601, with a source location 657 and a destination location 658. It also shows a code string 677 that is associated with the destination location 658.

In the vicinity of the source location 657 and the destination location 658, the domain 601 has been partitioned, at the high level, into eight high level tiles R001, R002, R003, R004, R006, R007, R008, R009 and, instead of a ninth tile R005 in the middle, more smaller ones to be described soon. In this example, R can be a set of digits for that vicinity, common for all numbers of the locations in the page.

In the middle level, instead of a tile R005, there are eight medium tiles R051, R052, R053, R054, R056, R057, R058, R059 and, instead of a tile R055 in the middle, more even smaller ones, to be described soon. It will be observed that the source location 657 is within the tile R054. As such, the source location datapoint SLDP=R054 can be used to define where the source location 657 is, within the domain 601. This second numbering scheme could be used also for lookup codes, in which case a source location lookup code for the source location 657 would be SLLC=R054.

Moreover, instead of a tile R055, there are nine low-level tiles R551, R552, ..., R559. It will be observed that the destination location 658 is within the tile R559. As such, the destination location datapoint DLDP=R559 can be used to define where the destination location 658 is, within the domain 601. Plus, per the above, a destination location lookup code DLLC=R559 can be used for the destination location 658.

In this numbering scheme, the R is the same, and all the tiles are described by the same number of digits following the R, which makes it easier for a system to parse them.

Figure 7:
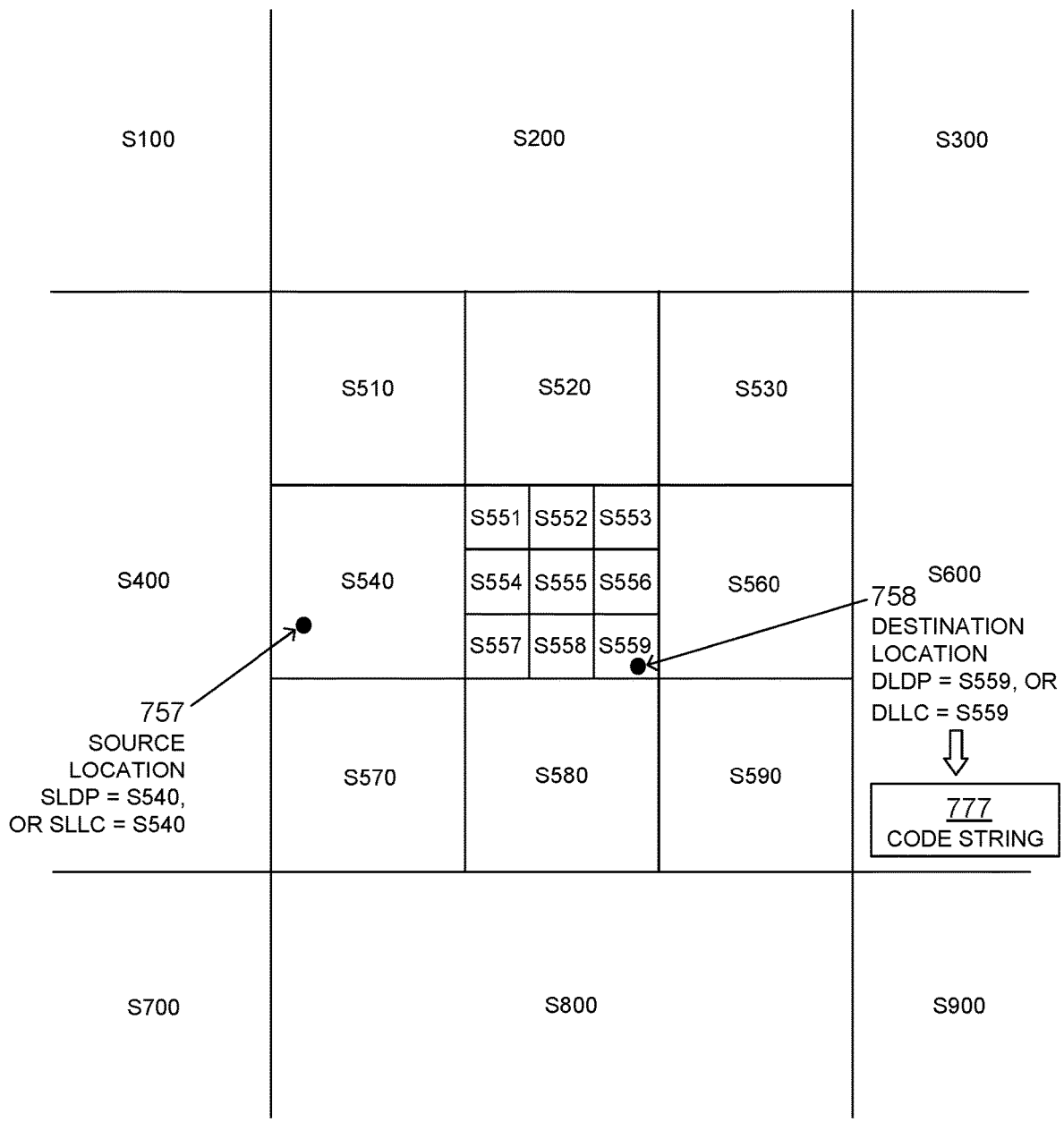
FIG. 7 is a diagram of a sample domain, a sample source location and a sample destination location within the domain, a sample code string, and in which the domain has been partitioned into tiles that have a third sample numbering scheme, according to embodiments.

FIG. 7 is provided for explaining a third numbering scheme. FIG. 7 shows a domain 701, with a source location 757 and a destination location 758. It also shows a code string 777 that is associated with the destination location 758.

In the vicinity of the source location 757 and the destination location 758, the domain 701 has been partitioned, at the high level, into eight high level tiles S100, S200, S300, S400, S600, S700, S800, S900 and, instead of a ninth tile S500 in the middle, more smaller ones to be described soon. In this example, S can be a set of digits for that vicinity, common for all numbers of the locations in the page.

In the middle level, instead of a tile S500, there are eight medium tiles S510, S520, S530, S540, S560, S570, S580, S590 and, instead of a tile S550 in the middle, more even smaller ones, to be described soon. It will be observed that the source location 757 is within the tile S540. As such, the source location datapoint SLDP=S540 can be used to define where the source location 757 is, within the domain 701. This third numbering scheme could be used also for lookup codes, in which case a source location lookup code for the source location 757 would be SLLC=S540.

Moreover, instead of a tile S550, there are nine low-level tiles S551, S552, ..., S559. It will be observed that the destination location 758 is within the tile S559. As such, the destination location datapoint DLDP=S559 can be used to define where the destination location 758 is, within the domain 701. Plus, per the above, a destination location lookup code DLLC=S559 can be used for the destination location 758.

In this numbering scheme, the S is the same, and all the tiles are described by the same number of digits following the S, which makes it easier for a system to parse them. Moreover, once a zero is reached within a number, the remaining digits are all known to be zeroes, which makes it even easier for a system to parse them.

Figure 8:
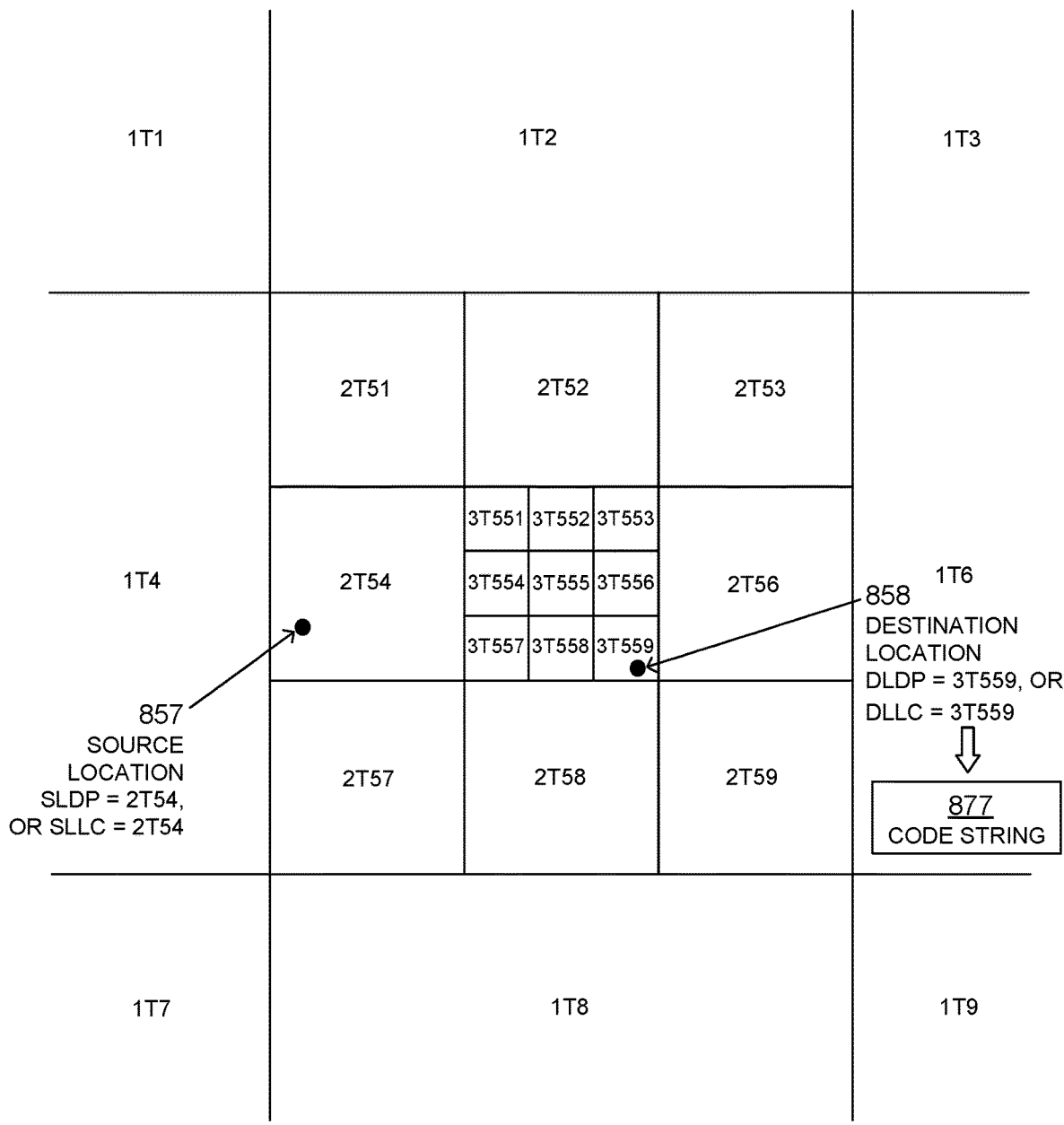
FIG. 8 is a diagram of a sample domain, a sample source location and a sample destination location within the domain, a sample code string, and in which the domain has been partitioned into tiles that have a fourth sample numbering scheme, according to embodiments.

FIG. 8 is provided for explaining a fourth numbering scheme. FIG. 8 shows a domain 801, with a source location 857 and a destination location 858. It also shows a code string 877 that is associated with the destination location 858.

In the vicinity of the source location 857 and the destination location 858, the domain 801 has been partitioned, at the high level, into eight high level tiles 1T1, 1T2, 1T3, 1T4, 1T6, 1T7, 1T8, 1T9 and, instead of a ninth tile 1T5 in the middle, more smaller ones to be described soon. In this example, T can be a set of digits for that vicinity, common for all numbers of the locations in the page.

In the middle level, instead of a tile 1T5, there are eight medium tiles 2T51, 2T52, 2T53, 2T54, 2T56, 2T57, 2T58, 2T59 and, instead of a tile 2T55 in the middle, more even smaller ones, to be described soon. It will be observed that the source location 857 is within the tile 2T54. As such, the source location datapoint SLDP=2T54 can be used to define where the source location 857 is, within the domain 801. This fourth numbering scheme could be used also for lookup codes, in which case a source location lookup code for the source location 857 would be SLLC=2T54.

Moreover, instead of a tile 2T55, there are nine low-level tiles 3T551, 3T552, ..., 3T559. It will be observed that the destination location 858 is within the tile 3T559. As such, the destination location datapoint DLDP=3T559 can be used to define where the destination location 858 is, within the domain 801. Plus, per the above, a destination location lookup code DLLC=3T559 can be used for the destination location 858.

In this numbering scheme, the T is the same for all the tiles, regardless of their size. However, the prefix before the T indicates how many digits are following. This makes it easier for a system to parse location datapoints and/or lookup codes of varying length.

An already known concept is Open Location Codes (OLC). These codes provide a way to identify almost any place that exists on the earth, irrespective of the country or region, using only an alphanumeric code. The open location code system is based on the existing latitude and longitude system which uses a grid to divide areas into small area tiles. A unique code can be assigned to each of the area tiles. A complete OLC for that concept (also referred as global code) contains ten (10) characters in total, with a '+' character before the last two characters. For a given OLC, the first four (4) characters narrow down the area search to a grid of around 100×100 kilometers; and the remaining 6-character code can help pin down a more exact location—it describes the area roughly 14×14 meters. The definition of OLC is extensible: by adding characters, one can increase accuracy. For instance, an additional accuracy of up to 3×3 meters can be achieved with additional characters.

Figure 9:
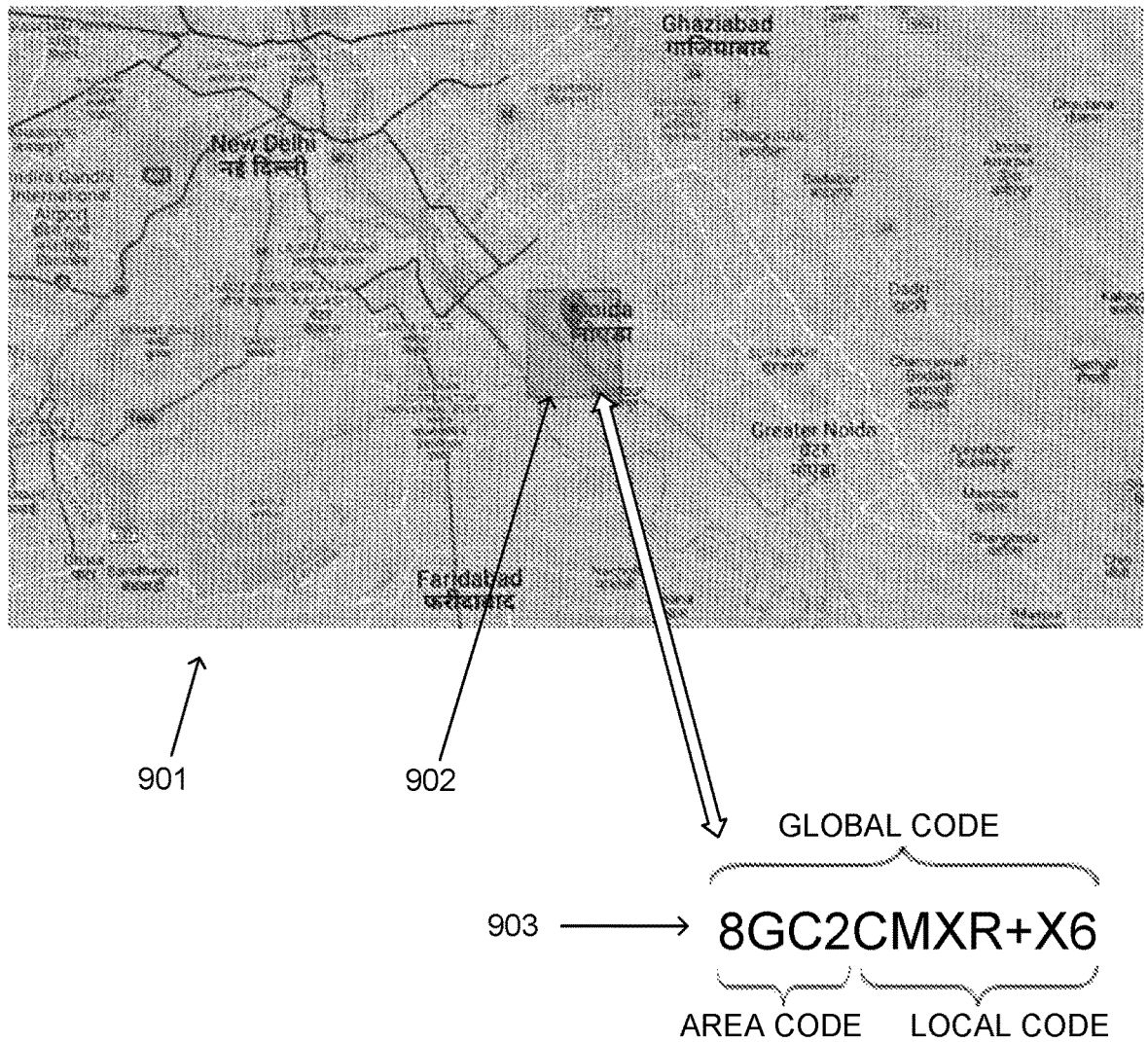
FIG. 9 is a diagram of a sample map with a portion identified and numbered per schemes in the prior art.

FIG. 9 was thus created from the concept of Open Location Codes. FIG. 9 is a diagram of a sample map 901 in India. The capital city of India, New Delhi, can be seen near the top left of the map. A portion 902 of the map is identified as an even darker square, which has an area of approximately 100 km×100 km. As also intimated above, it will be understood that such geographic subdivisions treat the earth as substantially flat in that location, which is an approximation that is more and more accurate the smaller the area becomes, and where therefore the earth's curvature plays a correspondingly lesser role.

A numbering scheme in the prior art provides a number 903 for the even darker portion 902. That number 903 is a global code 903, in the context of a larger domain is the entire earth. This global code includes an area code 8 GC2, which is not the same as an area code for telephone numbers. This area code describes the even darker portion 902. The global code 903 also includes a local code CMXR+X6. A portion or all of the area code or the global code can be the P, Q, R, S, or T in the codes of the previous five drawings, and so on.

Returning to FIG. 1, in embodiments, the computer system 195 receives one or more datasets, and is configured to parse, input, or extract values from them. A sample received dataset 135 is shown below the line 115. The dataset 135 may be received by the computer system 195 in a number of ways. In some embodiments, one or more requests may be received by the computer system 195 via a network. In this example, a request 184 is received by the computer system 195 via the network 188. The request 184 has been transmitted by the computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the dataset 135. In this example the single payload 134 encodes the entire dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the network 188, some beyond the control of the user 192 or OSP 198, and some within such control.

The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196, as indicated by arrows 199 in combination with arrows 111. (It should be noted that these arrows combinations describe correspondences, but not the journey of data in becoming the received dataset 135.) In some embodiments, the dataset 135 has values that characterize attributes of both the primary entity 193 and the secondary entity 196, but that is not required.

In some embodiments the one or more datasets, or just the dataset 135, include a base value BV. The base value BV may be a numerical base value for an aspect of the dataset, and so on. The aspect of the dataset may be the aspect of the value that characterizes the attribute, an aspect of the reason that the dataset was created in the first place, and so on.

In some embodiments the one or more datasets, or just the dataset 135, additionally include one or more of the following three elements:

i) A source location datapoint which, in the example of FIG. 1 is seen as SLDP. The source location datapoint may define a source location within a domain that has at least two dimensions. For instance, the source location datapoint may define a source location 157 within the domain 101.

ii) A destination location datapoint which, in the example of FIG. 1 is seen as DLDP. The destination location datapoint may define a destination location within a domain that has at least two dimensions. For instance, the destination location datapoint DLDP may define a destination location 158 within the domain 101.

iii) An item code which, in the example of FIG. 1 is seen as IC. The item code may define an item from a set of items. For instance, the item code IC may define the item 108 from a set of items. Suitable schemes may be used for items, for example Product identification codes, UPC codes, Stock Keeping Unit (SKU), custom systems, and so on.

In some embodiments, the computer system 195 is further configured to detect, from the one or more datasets, an indication about a length of the source location datapoint, or the destination location datapoint. In such embodiments, the parsing is performed according to the detected indication. For instance, in the numbering scheme of FIG. 8, the first number, e.g., 1 or 2, is an indication about a length of the source location datapoint, telling how many digits follow after the "T". Accordingly, the parsing can be performed according to the detected indication, by looking for as many digits come after the "T".

The dataset 135 may further have additional such values, as indicated by the horizontal dot-dot-dot in the right side of the dataset 135.

In embodiments, the computer system 195 is configured to cause a strings memory 170 to be accessed, in response to the received one or more datasets. The strings memory 170 may be hosted by the same place online software platform 198 that hosts the computer system 195, or by hosted by a strings memory host platform, in which case the strings memory 170 can be accessed remotely, via a network, and so on, as described in more detail later in this document. The strings memory host platform may be remote, controlled by a different entity and so on.

For causing the strings memory 170 to be accessed, and to be looked up, the computer system 195 may transmit a lookup query (not shown in FIG. 1) according to an arrow 171. A looked-up code string CSA may be returned, according to an arrow 141. In the event that the strings memory 170 is hosted remotely, the arrows 171 and 141 represent communications transmitted through a cloud, and so on.

In embodiments, the strings memory 170 stores code strings 177, which are described in more detail below. At least some of the code strings 177 may be stored in association with one or more of a) one or more source locations of the domain, b) one or more destination locations of the domain, and c) one or more items associated with the source locations and with the destination locations. This can be implemented in a number of ways, and examples are now described.

In the example of FIG. 1, possible ones of the one or more source locations are listed in a column 172. The listing may be in some encoded form, such a source location lookup code. For instance, the source location 157 may be represented by a source location lookup code SLLC. Such lookup codes may be alphanumeric, and so on.

In the example of FIG. 1, possible ones of the one or more destination locations are listed in a column 173. The listing may be in some encoded form, such a destination location lookup code. For instance, the destination location 158 may be represented by a destination location lookup code DLLC.

In the example of FIG. 1, possible ones of the one or more source items are listed in a column 174. The listing may be in some encoded form, such an item lookup code. For instance, the item 108 may be represented by an item lookup code ILC.

The strings memory 170 may have multiple rows, each with different combinations of possible source locations, possible destination locations and possible items. For each of at least some of the rows, one code string can be provided, from the column 177.

The above was only one example. As will be seen later in this document, in other embodiments one or more of the columns 172, 173, 174 may be merged, and so on.

In embodiments, the computer system 195 is configured to cause a first code string to be looked up from the code strings stored in the strings memory. In embodiments, the first code string is looked up in association with the one or more of i) the dataset's defined source location, ii) the defined destination location, and iii) the defined item.

In the example of FIG. 1, the computer system 195 causes the looking up, from the strings memory 170, of a code string CSA from the code strings 177. The code string CSA is looked up in association with the one or more of i) the source location 157, ii) the destination location 158, and iii) the item 108, that is/are defined in the dataset 135. The looking up is depicted by arrow 171, which selects the appropriate row, i.e., the row that has the right combination of the queried parameters.

Embodiments for the looking up, per the arrow 171, are now described in more detail.

In some embodiments, the encoding of the dataset 135 is engineered to match in advance the encoding of one or more portions of the strings memory. In such embodiments, the looking up can be performed by applying to the strings memory the parsed one or more of: i) the source location datapoint and ii) the destination location datapoint. Optionally also the parsed item code. An example is now described.

Figure 10:
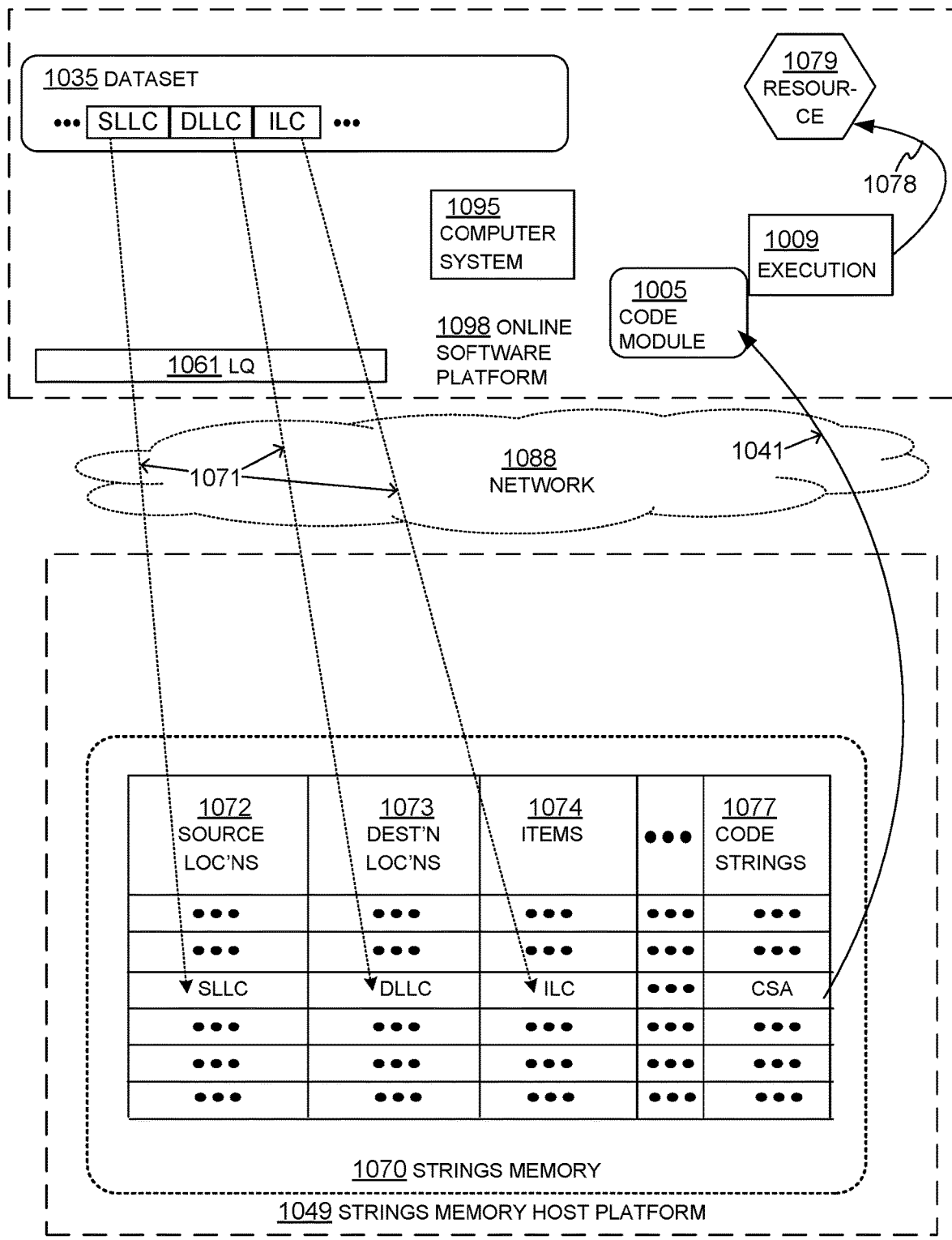
FIG. 10 is a diagram for describing aspects of accessing a strings memory and looking up a code string from it, according to embodiments.

FIG. 10 is a diagram for describing aspects of looking up a strings memory 1070, which can be as the strings memory 170. In this example, the strings memory 1070 has a column 1072 for possible source locations, a column 1073 for possible destination locations, a column 1074 for possible items, and a column 1077 for the corresponding stored associated code strings that can be looked up, all similarly with the strings memory 170. In addition, the strings memory 1070 stores the same values as the strings memory 170.

In the example of FIG. 10, a dataset 1035 is received by a computer system 1095, which can be as the computer system 195. In this diagram the computer system 1095 is shown artificially as a separate small block, so as to not unduly clutter the drawing. The dataset 1035 already encodes i) the source location lookup code SLLC as its source location datapoint SLDP, ii) the destination location lookup code DLLC as its destination location datapoint DLDP, and iii) the item lookup code ILC as its item code IC, which is why the values of the dataset 1035 are shown as they are. For the looking up, these values are used directly to query the strings memory 1070, to look up the code string CSA, as shown by arrows 1071 similar to arrow 171. In particular, a lookup query LQ 1061 can be formed, and be applied to the strings memory 1070 per the arrows 1071. The code string CSA can be returned in response to the lookup query LQ 1061 according to an arrow 1041 similar to the arrow 141.

The computer system 1095 may be hosted by an online software platform (OSP) 1098, which can be as the online software platform 198. As already mentioned with the description of FIG. 1, in some embodiments the strings memory 1070 is also hosted by the OSP 1098, and the arrows 1071, 1041 describe communications within the OSP 1098.

In other embodiments, the strings memory 1070 is hosted remotely. This is shown as optional in FIG. 10, by the following optional features: a communications network 1088 that can be as the network 188, the OSP 1098 optionally including only what is above the communications network 1088, and a strings memory host platform 1049 that hosts the strings memory 1070. In this case, as with the description of FIG. 1, the arrows 1071, 1041 pass through the network 1088.

Then a code module 1005 can be formed from the code string CSA, and the code module 1005 can be executed per an execution block 1009 to produce a resource 1079 according to an arrow 1078, all similarly to how similar elements are described for FIG. 1.

The matching of encodings of FIG. 10 may be performed at the dataset level, for instance, on the client side, e.g., by use of a suitably planned software connector. Or, equivalently, the encoding of the strings memory 1070 may be performed to match the data brought by the dataset 1035.

In other embodiments, conversion is performed so that the data of the dataset 1035 matches the lookup codes used in the strings memory. In particular, the computer system 1095 can be configured to convert at least one of the source location datapoint and the destination location datapoint into a location lookup code. In such embodiments, the first code string is looked up by the location look up code. Optionally also the parsed item code. An example is now described.

Figure 11A:
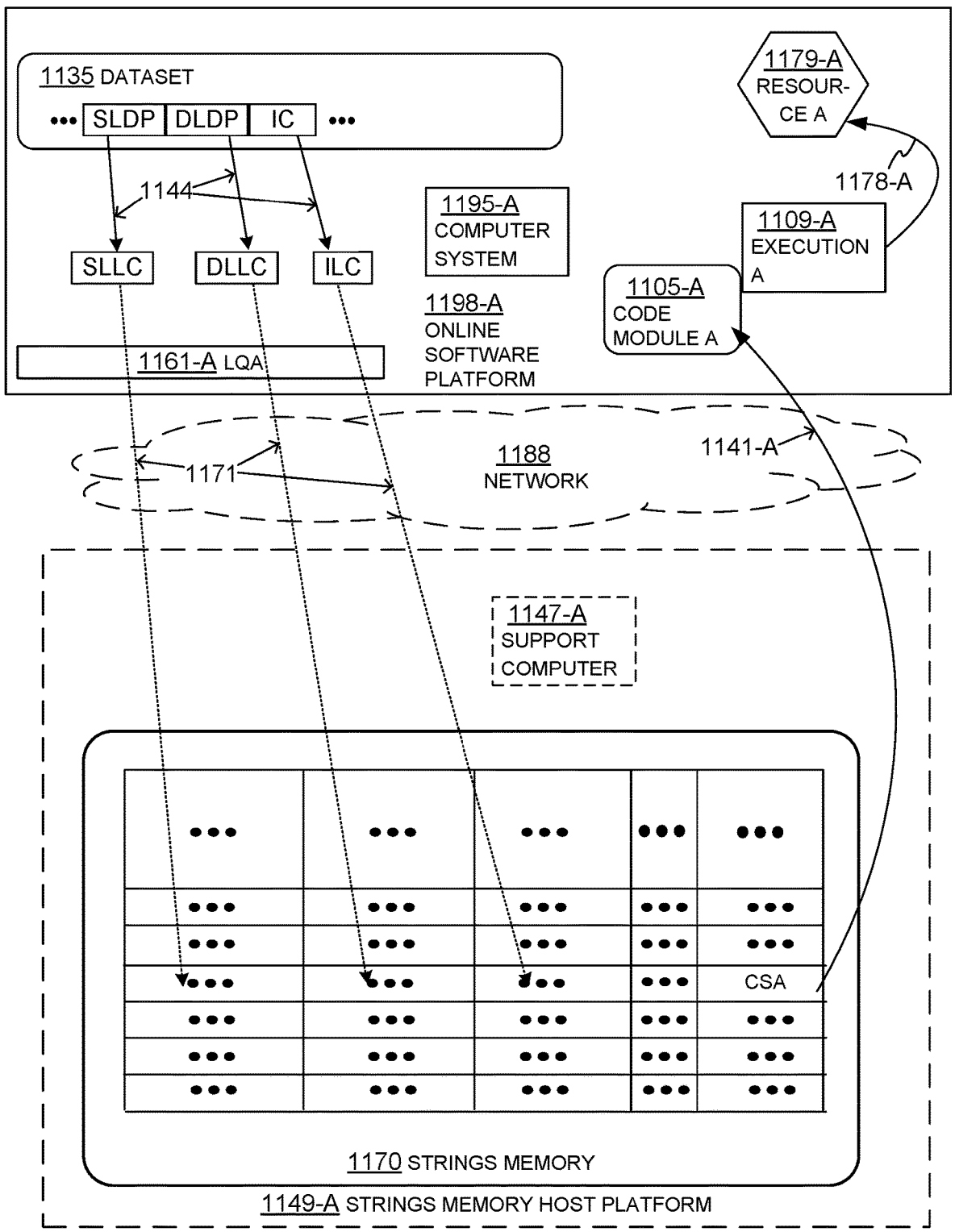
FIG. 11A is a diagram for describing aspects of accessing a strings memory and looking up a code string from it, according to embodiments.

FIG. 11A is a diagram for describing aspects of looking up a strings memory 1170, which can be as the strings memory 170 or the strings memory 1070, and which is why its more detailed information is not repeated.

Similarly to FIG. 1, in the example of FIG. 11A a dataset 1135 is received by a computer system 1195-A, which can be as the computer system 195. In this diagram the computer system 1195-A is shown artificially as a separate small block, so as to not unduly clutter the drawing. The dataset 1135 encodes i) its source location datapoint SLDP, ii) its destination location datapoint DLDP, and iii) its item code IC, which are parsed by the computer system 195, as per the above. In this example, three conversions 1144 are then performed: i) the source location datapoint SLDP is converted to the source location lookup code SLLC, ii) the destination location datapoint DLDP is converted to the destination location lookup code DLLC, and iii) the item code IC is converted to the item lookup code ILC. Fewer conversions may be performed, or more for additional elements, and so on.

In some embodiments, the converting of operation 1144 includes adding one or more characters to the at least one of the source location datapoint and the destination location datapoint. The one or more characters can be a zero, or other characters for accommodating a numbering scheme of tiles. For instance, the added one or more characters can be one or more leading zeroes, such as might be the case for numbering tiles in the numbering scheme of FIG. 6. Or, the added one or more characters can be one or more trailing zeroes, such as might be the case for numbering tiles in the numbering scheme of FIG. 7.

Then, for the looking up, these converted values are used to query the strings memory 1170, to look up the code string CSA, as shown by arrows 1171 similar to arrow 171. In particular, a lookup query LQA 1161-A can be formed, and be applied to the strings memory 1170 per the arrows 1171. The code string CSA can be returned in response to the lookup query LQA 1161-A according to an arrow 1141-A similar to the arrow 141.

Similarly with FIG. 10, FIG. 11A also shows the following optional features: a communications network 1188 that can be as the network 188, the OSP 1198-A optionally including only what is above the communications network 1188, a strings memory host platform 1149-A that hosts the strings memory 1170, and a support computer 1147-A that is hosted by the remote strings memory host platform 1149-A, for operations of at least the strings memory 1170, etc. In this case, as with the description of FIG. 1, the arrows 1171, 1141-A pass through the network 1188.

Then a code module A 1105 can be formed from the code string CSA, and the code module A 1105 can be executed per an execution A block 1009-A to produce a resource A 1179-A according to an arrow 1178-A, all similarly to how similar elements in FIG. 1 are described.

In some embodiments, where the strings memory is hosted by a strings memory host platform that is remote from an online software platform that hosts the computer system, only the code string is received, and is processed by the computer system. In such embodiments, causing the strings memory to be accessed includes at least: forming, by the computer system, a lookup query from at least one of the source location lookup code and the destination location lookup code; causing, by the computer system, the lookup query to be transmitted over a network from the computer system to a support computer that is hosted by the strings memory host platform; and receiving, by the computer system, the looked up first code string from the support computer.

As example of that is seen in FIG. 11A, as optional only. Indeed, the strings memory 1170 is optionally hosted by a strings memory host platform 1149-A that is remote from an online software platform 1198-A. The strings memory host platform 1149-A also hosts and is operated by a support computer 1147-A. The strings memory 1170 is caused to be accessed by the computer system 1195-A forming a lookup query LQA 1161-A from at least one of the source location lookup code SLLC and the destination location lookup code DLLC; and causing the lookup query LQA 1161-A to be transmitted over the network 1188 from the computer system 1195-A to the support computer 1147-A that is hosted by the strings memory host platform 1149-A. From that, the code string SCA is looked up. In addition, the computer system 1195-A receives the looked up code string SCA from the support computer 1147-A via an arrow 1141-A.

In some embodiments, where the strings memory is hosted by a strings memory host platform that is remote from an online software platform that hosts the computer system, the code module is also formed remotely, and is then received and processed by the computer system. In such embodiments, causing the strings memory to be accessed includes at least: forming, by the computer system, a lookup query from at least one of the source location lookup code and the destination location lookup code; and causing, by the computer system, the lookup query to be transmitted over a network from the computer system to the strings memory host platform for generation of the code module by a support computer in the strings memory host platform. In such embodiments, the first code module is caused to be generated by causing the support computer to generate the first code module. Then the generated first code module can be received by the computer system from the support computer.

Figure 11B:
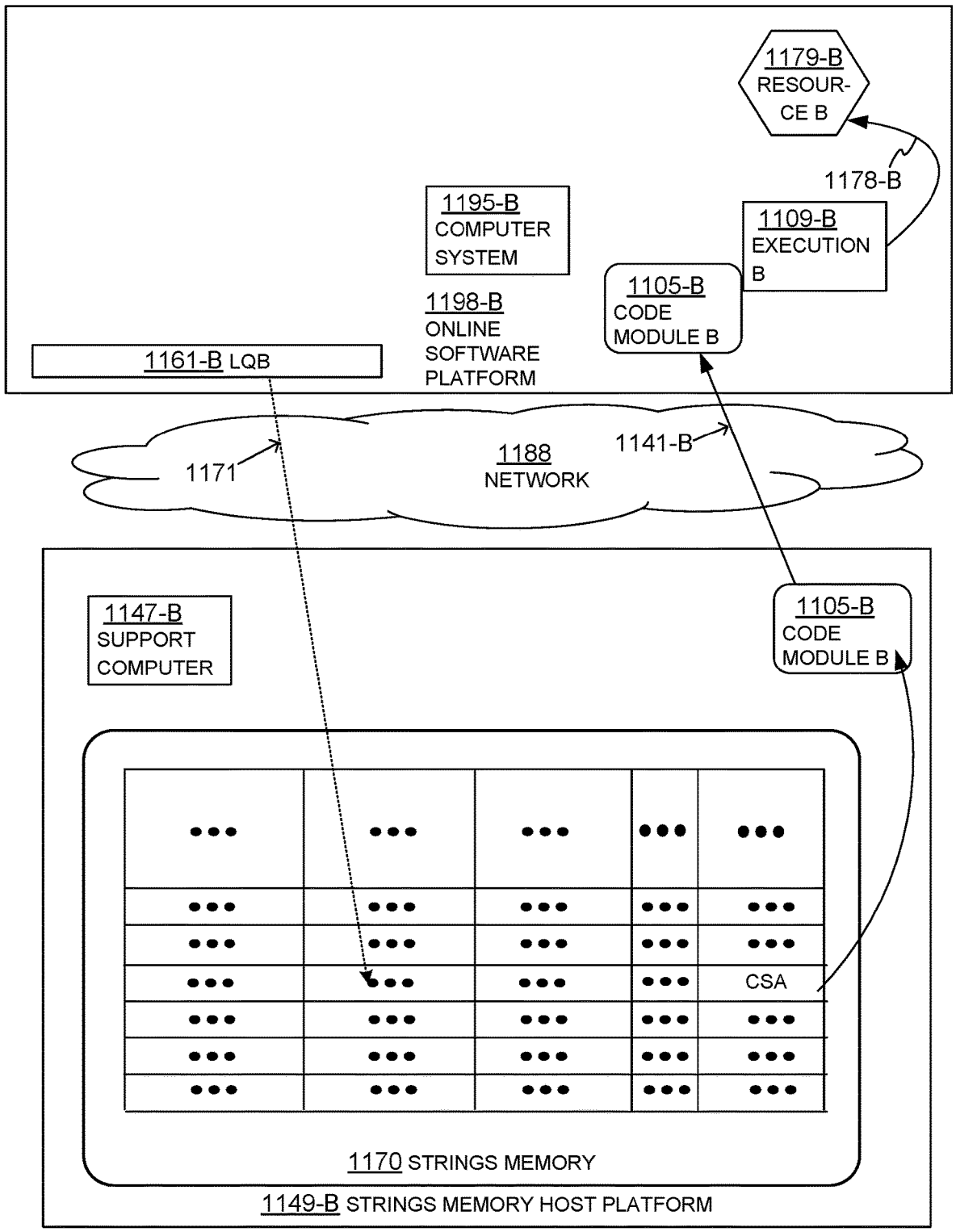
FIG. 11B is a diagram for describing aspects of accessing a strings memory when it is hosted remotely according to embodiments.

FIG. 11B shows as example of that. A computer system 1195-B that can be as the computer system 195 is hosted by an online software platform 1198-B that can be as the OSP 198. A strings memory host platform 1149-B is remote from the OSP 1198-B, and communicates with it via the network 1188. The strings memory 1170 is hosted this time, by the strings memory host platform 1149-B. The strings memory host platform 1149-B also hosts and is operated by a support computer 1147-B.

The strings memory 1170 is caused to be accessed by the computer system 1195-B by: forming a lookup query LQB 1161-B; and causing the lookup query LQB 1161-B to be transmitted over the network 1188, from the computer system 1195-B to the strings memory host platform 1149-B. From the strings memory 1170 that is hosted there, the code string SCA is looked up. The code module B 1105-B is caused by the computer system 1195-B to be generated by the computer system 1195-B causing the support computer 1147-B to generate the code module 1105-B. Then the generated code module B 1105-B is received by the computer system 1195-B from the support computer 1147-B via an arrow 1141-B. Then the received code module B 1105-B is executed by an execution B block 1109-B of the computer system 1195-B to produce, according to an arrow 1178-B, a resource B 1179-B.

In some embodiments, where the strings memory is hosted by a strings memory host platform that is remote from an online software platform that hosts the computer system, the code module is also formed remotely, and is then executed to produce the first resource. Then the resource is received by the computer system, the notification can be sent, and so on. In such embodiments, causing the strings memory to be accessed includes at least: forming, by the computer system, a lookup query from at least one of the source location lookup code and the destination location lookup code; and causing, by the computer system, the lookup query to be transmitted over a network from the computer system to the strings memory host platform. In such embodiments, the first code module is caused to be generated by causing a support computer that is hosted by the strings memory host platform to generate the first code module. And, causing the first code module to be executed may include causing the support computer to execute the first code module to produce the first resource. Then the produced first resource can be received by the computer system from the support computer.

Figure 11C:
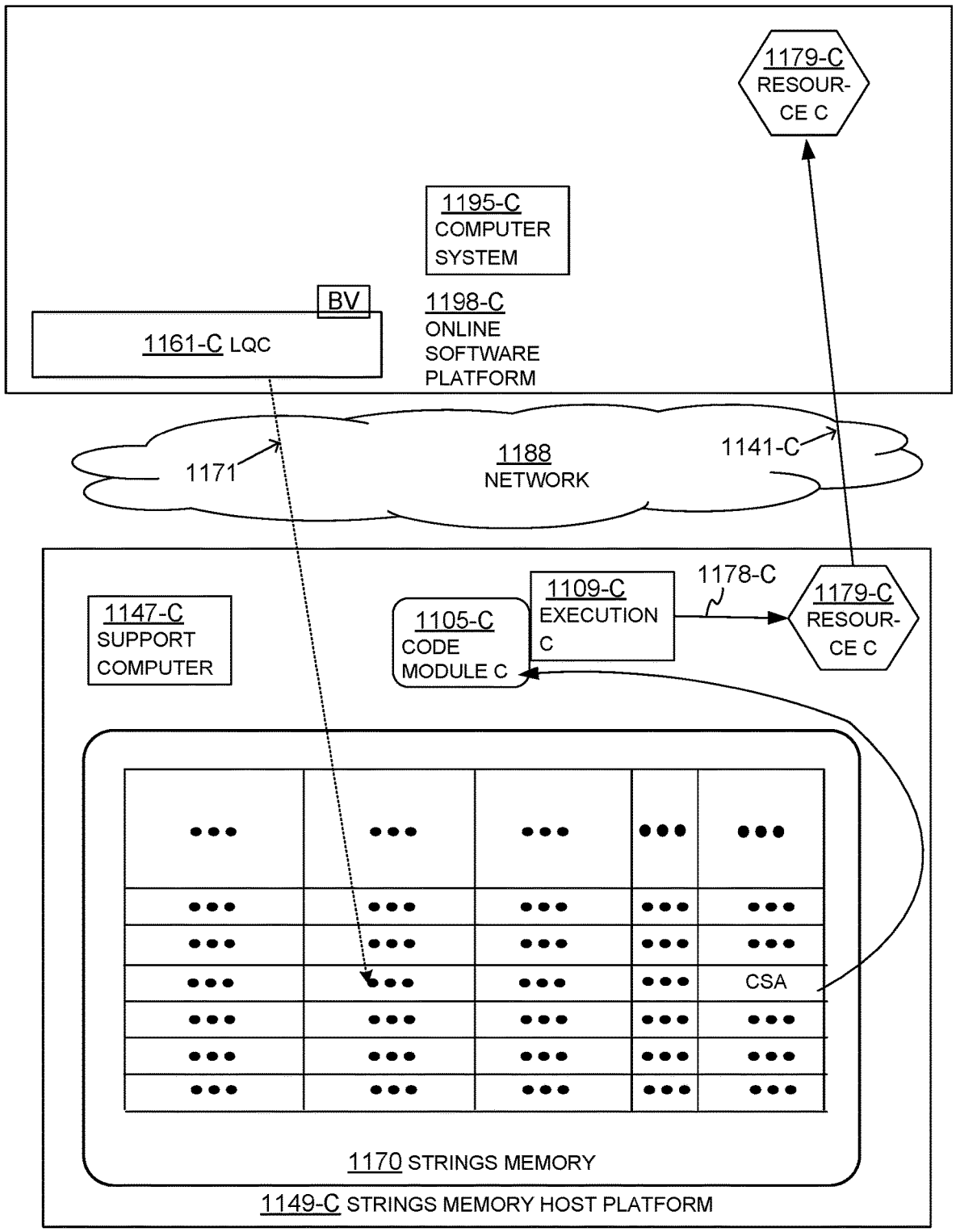
FIG. 11C is a diagram for describing aspects of accessing a strings memory when it is hosted remotely according to additional embodiments.

FIG. 11C shows as example of that. A computer system 1195-C that can be as the computer system 195 is hosted by an online software platform 1198-C that can be as the OSP 198. A strings memory host platform 1149-C is remote from the OSP 1198-C, and communicates with it via the network 1188. The strings memory 1170 is hosted, this time, by the strings memory host platform 1149-C. The strings memory host platform 1149-C also hosts and is operated by a support computer 1147-C.

The strings memory 1170 is caused to be accessed by the computer system 1195-C by: forming a lookup query LQC 1161-C; and causing the lookup query LQC 1161-C to be transmitted over the network 1188, from the computer system 1195-C to the strings memory host platform 1149-C. From the strings memory 1170 that is hosted there, the code string SCA is looked up. A code module 1105-C is caused by the computer system 1195-C to be generated by the computer system 1195-C causing the support computer 1147-C to generate the code module 1105-C. And, causing the code module 1105-C to be executed may include the computer system 1195-C causing the support computer 1147-C to execute the code module 1105-C by an execution C block 1109 to produce a resource C 1179-C according to an arrow 1178-C. Then the produced resource C 1179-C is received by the computer system 1195-C from the support computer 1147-C, via an arrow 1141-C across the network 1188. It will be understood that, since the resource C 1179-C is produced remotely, the base value has to be communicated also across the network 1188. This can be done in conjunction with the lookup query LQC 1161-C, as suggested in FIG. 11C, or separately. For instance, the base value BV can be embedded in the lookup query LQC 1161-C.

The variations of FIGS. 11A, 11B, 11C can also apply to the embodiments of FIG. 1 and FIG. 10.

Returning now to various embodiments of querying the strings memory, the example of FIG. 10 had a strings memory 1070 that had separate columns for inputs for the source location datapoint, the destination location datapoint, and the item code. This is not necessary, and two types of embodiments are now described.

In a first type of embodiments, the strings memory can be partitioned, for ease of access. For example, the strings memory can be partitioned according to different source location datapoints, according to different destination location datapoints, and according to different item codes.

In a second type of embodiments, two or more of these columns may be combined into a single column; in such cases, the lookup query 1061, 1161-A, 1161-B, 1161-C can sometimes be a single query string; such a query string can be part of the lookup queries described above. Examples are now described.

In some embodiments, the looking up is performed by applying to the strings memory a single query string that is derived by concatenating, in any order, at least two of: a first query made from the source location datapoint, a second query made from the destination location datapoint, and a third query made from the item code. An instance is now described.

Figure 12:
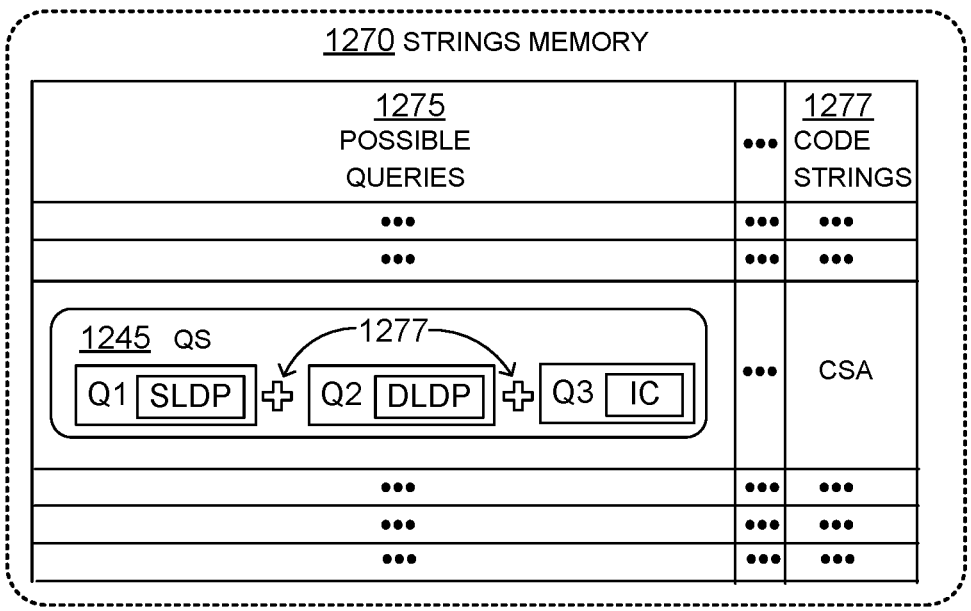
FIG. 12 is a diagram of first sample organization of a strings memory according to embodiments.

FIG. 12 is a diagram for describing a sample organization of a strings memory 1270, which can be as the strings memory 170. In this example, the strings memory 1270 has a single column 1275 for possible queries about the source location, the destination location and the item. It may optionally have other columns per the dot-dot-dots for implementing additional selection or validity criteria. The strings memory 1270 also has a column 1277 for the corresponding stored associated code strings that can be looked up, all similarly with the strings memory 170.

A single query string QS 1245 has been derived by concatenating other queries. The concatenations are indicated by the "plus" signs 1277. In the example of FIG. 12, these other queries are: a first query Q1 made from the source location datapoint SLDP, a second query Q2 made from the destination location datapoint DLDP, and a third query Q3 made from the item code IC. These queries may be made by adding or substituting elements of the location datapoints, converting the item code from one system of codes to another, and so on.

A single query can yield the result relatively fast, especially if the strings memory 1270 has no other columns and is in the form of a table or spreadsheet.

In some embodiments, the looking up is performed by applying to the strings memory a single query string that is derived by concatenating, in any order, at least two of: the source location datapoint, the destination location datapoint, and the item code. An instance is now described.

Figure 13:
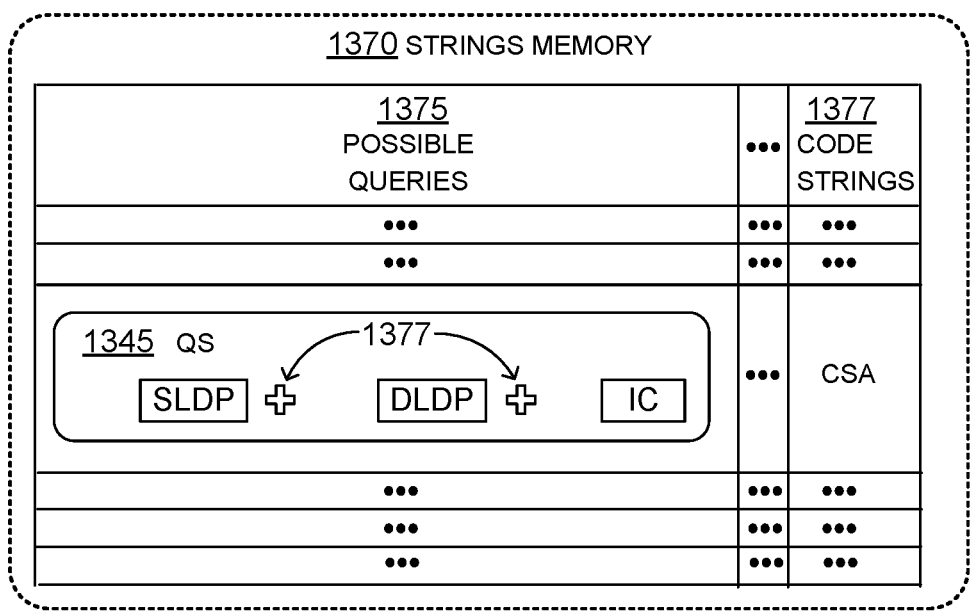
FIG. 13 is a diagram of second sample organization of a strings memory according to embodiments.

FIG. 13 is a diagram for describing a sample organization of a strings memory 1370, which can be as the strings memory 170. In this example, the strings memory 1370 has a single column 1375 for possible queries about the source location, the destination location and the item. It may optionally have other columns per the dot-dot-dots for implementing additional selection or validity criteria. The strings memory 1370 also has a column 1377 for the corresponding stored associated code strings that can be looked up, all similarly with the strings memory 170.

A single query string QS 1345 has been derived by concatenating the source location datapoint SLDP, the destination location datapoint DLDP, and the item code IC. The concatenations are indicated by the "plus" signs 1277.

Returning to FIG. 1, the first code string that is thus looked up can be configured to implement a first rule of the domain about the one or more of the i) the defined source location, ii) the defined destination location, and iii) the defined item transitioning from the defined source location and/or to the defined destination location. The first rule can be about the pair of the defined source location and the defined destination location, sometimes in the context of the defined item transitioning from the defined source location to the defined destination location.

In the example of FIG. 1, the code string that is thus looked up is CSA. This is output from the strings memory 170 per the arrow 141, as previously described. The tip of the arrow 141 is shown as reaching into a code module A 105. In embodiments, a first code module, such as code module A 105, is generated from the first code string, such as the code string CSA. For clarification, and as will be seen also later, the first code module may be generated also from additional code strings, other considerations, and so on.

A sample rule A 151 is shown as a pentagon. Arrows connecting the rule A 151 with other elements are intended to show relationships, not operations or transitions.

In embodiments, a code string is a character string that uses a Domain Specific Language (DSL). A domain-specific language is created specifically to solve problems in a particular domain and is not intended to be able to solve problems outside of it (although that may be technically possible). Another example can be language of the type used in the Excel® product of Microsoft®, with proper adaptations. Examples of such a language could be largely in alphanumeric form, but further may include other characters, for instance the "equals" character ("="), the "plus"

character for addition ("+"), the "minus" character for subtraction ("−"), the "star" character for multiplication ("*") the "larger than" character (">"), the "smaller than" character (">"), and so on. These are, coincidentally, the characters that can be used to compute the value of an expression in Microsoft® Excel®. In examples, this document uses the Microsoft® Excel® DSL.

In some embodiments, the first code module is the first code string. An example is now described.

Figures 14, 15:
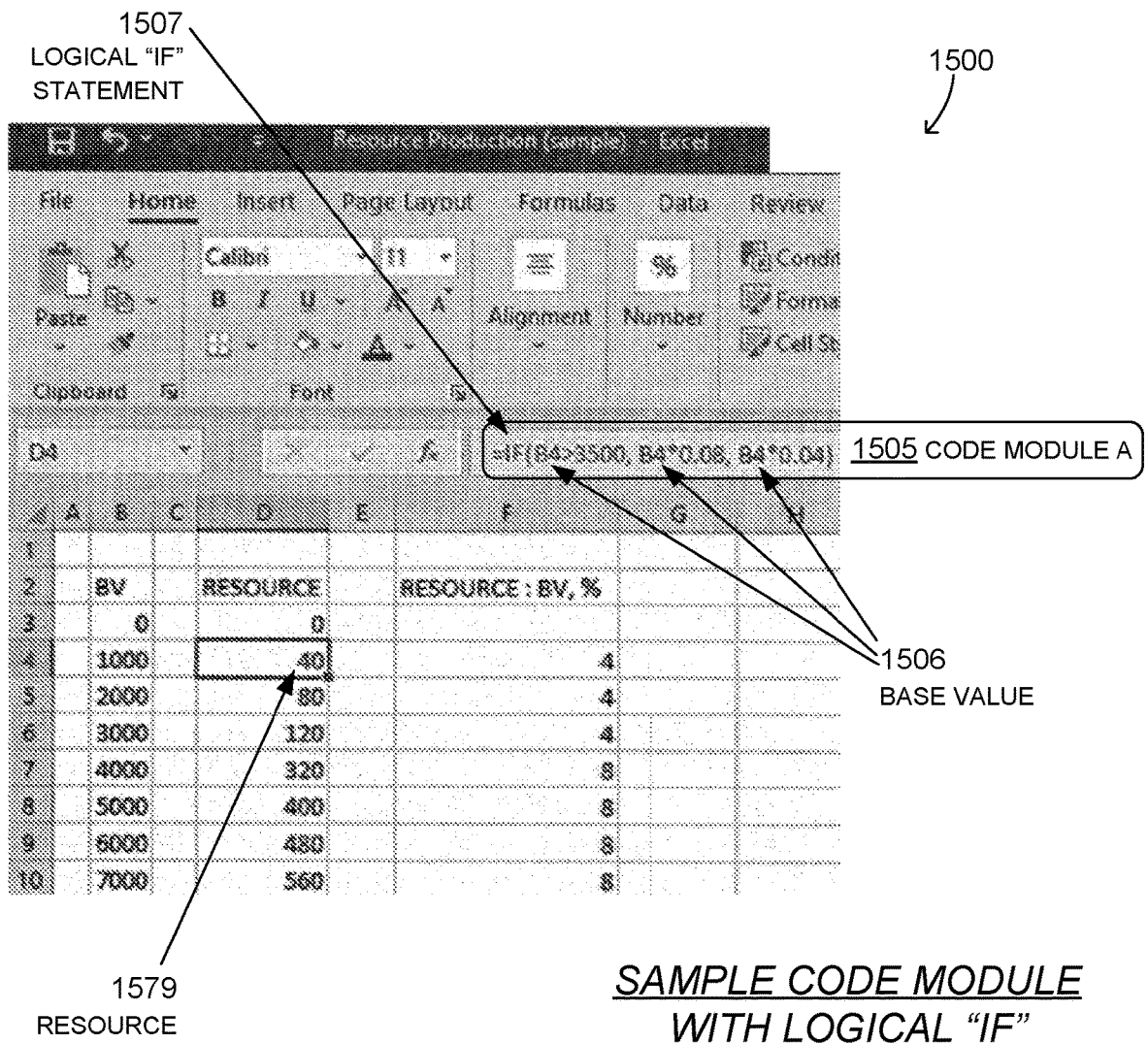
FIG. 14 is a table of sample values for a code string and a code module according to embodiments.
FIG. 15 is an image of a portion of a User Interface of an execution module, in which a sample code module can be seen, and which includes a logical "IF" statement according to embodiments.

FIG. 14 is a table of values 1400. Unconventionally, in table 1400 the titles are in the first row and the values are in the second row, for consistency with another table in this document. A code string CSA 1477 has the value shown, which starts with the "equals" (=) sign. A code module A 1405 has the value shown, which is the same as that of the code string CSA 1477.

As such, in this example, the code string CSA 1477 and/or the code module A 1405 is a piece of code that is ready for execution. Execution of this piece of code may produce a resource.

In some embodiments, the first code module references the base value as a variable. In the example of FIG. 14, the code module A 1405 indeed references the base value 1406, as a variable BV to be multiplied by a number.

The example of FIG. 14 is where the code module A 1405 mandates a multiplication of the base value BV with the number 0.065. For instance, this code module A 1405 may be implementing a rule (not shown), that requires to: "multiply the base value by 0.065". This rule is written in format understandable at least by Excel®. More complex rules are also possible, as seen immediately below.

It will be observed that, while this code module A 1405 may be implementing a rule, it might not apply the rule at this stage. Rather, tis code module A 1405 may be implementing a rule upon execution at a later stage. In fact, the rule can be applied at a later stage, as seen later in this document. To those very skilled in the art of computer coding, it might fairly seem that the code module A 1405 reflects a rule, embodies a rule, describes a rule, and so on, for the rule to: "multiply the base value by 0.065".

In some embodiments, the first code module includes a logical "IF" statement. An example is now described.

FIG. 15 is an image of a portion 1500 of a User Interface of a Microsoft® Excel® program, which can provide the execution for a Code Module A 1505. The Code Module A 1505, as applied to cell D4, is =IF(B4>3500, B4*0.08, B4*0.04). In this expression, B4 is the cell that shows the applicable base value BV, which is why the occurrences of B4 are also designated as the base value 1506. This expression also includes a logical "IF" statement 1507.

This code module A 1505 may be implementing a rule (not shown), that requires to: "If the base value is larger than 3500 multiply the base value by 0.08, else multiply the base value by 0.04". This rule is written in format understandable at least by Microsoft® Excel®. More features of FIG. 15 are described later in this document.

In the example of FIG. 14, the code module A 1405 was identical to the code string CSA 1477 from the beginning. As such, the strings memory was storing ready-to-execute code that is looked up and then executed. Such is in not required, however. In some embodiments, the computer system 195 is further configured to generate, from the first code string, the first code module that will be executed. Examples are now described.

In some embodiments, generally speaking, the first code module is generated from a first code kernel of the first code string. In such embodiments, the first code kernel can be the first code string, or a subset of the first code string. Again, the first code kernel may include a logical "IF" statement. An example is now described.

Figures 16A, 16B:
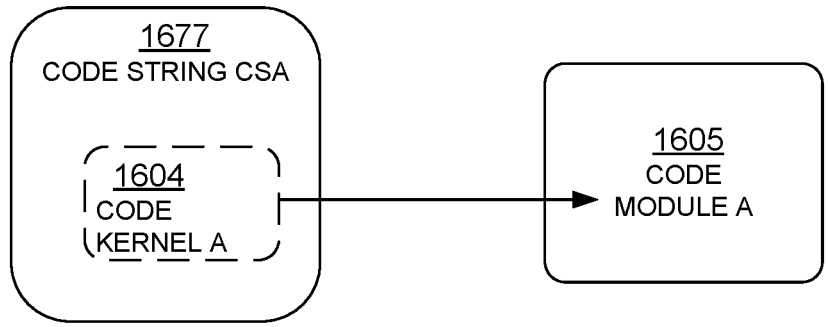
FIG. 16A is a diagram of a sample way for a code module to be generated according to embodiments.
FIG. 16B is a table of sample values for embodiments of the components of FIG. 16A.

FIG. 16A is a diagram of a sample way for a code module to be generated according to embodiments. A code string CSA 1677 includes a code kernel A 1604. A code module A 1605 is made from the code kernel A 1604.

In some embodiments, the first code module is generated by further altering the first code kernel. The altering can be done in a preset manner, even per an instruction from the dataset, or specific data of the client. In some embodiments, altering may be performed by inputting the code kernel into a template subroutine, and so on. An example is now described.

FIG. 16B is a table 1600 of sample values for embodiments of the components of FIG. 16A. In this example, the bottom row shows the value of the code module A 1605 as: =IF(BV>3500, BV*0.08, BV*0.04). It will be recognized that this is executable by at least Excel®, and in fact it is the same as the Code Module A 1505 of FIG. 15, except that BV is written instead of B4.

In the example of the table 1600, the code kernel A 1604 is same as the code string CSA 1677. In fact, both are the same as the code module A 1605, except without the beginning "equals" (=) sign. This is also an example of where the code kernel A 1604 was altered, by adding, at the beginning, an "equals" (=) sign, to generate the code module A 1605. The values of the table 1600 are also an example of where the code kernel A 1604 includes a logical "IF" statement.

Returning to FIG. 1, in embodiments the computer system 195 can be further configured to produce, by executing a first code module that is generated from the first code string, a first resource that complies with the first rule. In some embodiments, therefore, executing the code module resulting in applying the rule that the code module implements.

As seen in the particular example of FIG. 1, an execution block 109 is shown for the executing. The execution block 109 is shown as executing the code module 105 that is adjacent to it. As before, the code module 105 has been generated from the code string CSA. The execution produces a resource 179, according to an arrow 178. The resource 179 can be the first resource in a context, or the only resource in a context. (Same with first code module and first code string, seconds of each, and so on.) The resource 179 complies with the above-described rule A 151. The resource can be a computational result prepared for the user 192, the primary entity 193, the secondary entity 196, etc. Still in FIG. 1, an arrow from the base value BV goes to the intersection of the execution block 109 and the code module A 105 because the base value BV can be used by either one, as will be seen later in this document.

Many individual examples of produced resources are shown in the lower portion of FIG. 15. A number of possible base values BV are listed in column B. For each such value, the produced resource is shown in column D. A sample produced resource 1579 is indicated. Also, the percentage applied each time is shown in column F. Upon checking, the percentage indeed goes from 4 to 8 when the BV goes from 3000 to 4000.

Excel® was thus very useful in the description of this document, but is not required to be used in actual embodiments. Excel® is also useful because it uses a high-level language with which to write a code module in a way that can be stored in a strings memory as ready executable code, or approximately ready, and can be further transferred across the network 188, 1088, 1188 as a payload.

In such embodiments, the executing can be performed in conjunction with the base value. This can be performed in a number of ways. Examples are now described.

Figure 17:
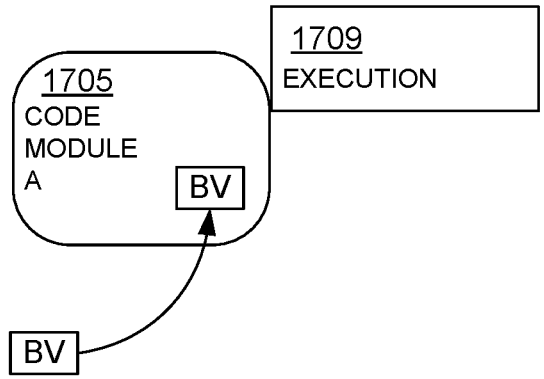
FIG. 17 is a diagram for showing a first example of how the executing of a code module can be performed in conjunction with a base value according to embodiments.

In some embodiments, the first code module includes the base value as a variable. For instance, FIG. 17 shows a code module A 1705 and an execution block 1709, similar to those of FIG. 1, and in fact similarly presented relative to each other. In addition, the code module A 1705 includes the base value BV as a variable. In particular, the code module A 1705 was formed to include as a variable the base value BV from when the base value BV was parsed from the received dataset. Examples of that were already seen in FIGS. 14 and 16B.

Figure 18:
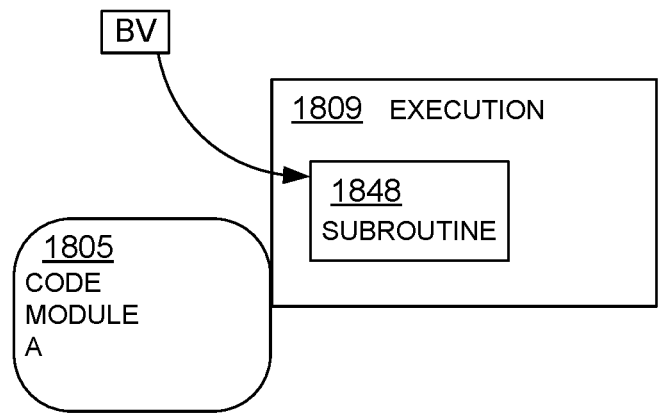
FIG. 18 is a diagram for showing a second example of how the executing of a code module can be performed in conjunction with a base value according to embodiments.

In some embodiments, the base value is called as a variable from outside the code module. For instance, the first code module can be executed by a subroutine that calls the base value as a variable. For example, FIG. 18 shows a code module A 1805 and an execution block 1809, similar to those of FIG. 1, and in fact similarly presented relative to each other. In addition, the execution block 1809 includes a subroutine 1848 that calls the base value BV as a variable.

Returning to FIG. 1, in embodiments the computer system 195 can be further configured to cause a notification about an aspect of the first resource to be transmitted over the network to one of an output device and another device.

In the particular example of FIG. 1, a notification 136 about an aspect of the resource 179 is generated. In particular, the notification 136 may inform about the aspect of the resource 179, namely that it has been determined, where it can be found, what it is, or at least a portion or a statistic of its content, a rounded version of it, and so on. Of course, the planning should be that the recipient of the notification 136 understands what it is being provided.

The notification 136 can be caused to be transmitted, for example, as an answer or other response to the received dataset 135. The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135 was received, as in the example of FIG. 1. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example the single payload 137 encodes the entire notification 136, but that is not required. Similarly with what is written above about encoding datasets in payloads, the notification 136 instead may be provided via two or more payloads, or in other cases the notification 136 and at least one other notification may be included in the same single payload. Along with the aspect of the resource 179, it can be advantageous to embed in the payload 137 the identity value (ID) and/or one or more values of the dataset 135. This will help the recipient correlate the response 187 to the request 184, and therefore match the received aspect of the resource 179 as the answer or other response to the appropriate dataset.

In the example of FIG. 1, according to arrow 171, a single code string SCA was found from the query formed by the data of the dataset 135. This is not required. In fact, multiple code strings may be found from a query formed by the data of a single dataset. In particular, in embodiments the computer system can be further configured to cause a second code string to be looked up from the code strings stored in the strings memory. The second code string may be associated with the one or more of i) the dataset's defined source location, ii) the dataset's defined destination location, and iii) the dataset's defined item, just as the first code string was. In addition, the second code string can be configured to implement a second rule about the one or more of the dataset's i) the defined source location, ii) the defined destination location, and iii) the defined item transitioning from the defined source location and/or to the defined destination location. The second rule can be distinct from the first rule. Examples are now described.

Figure 19:
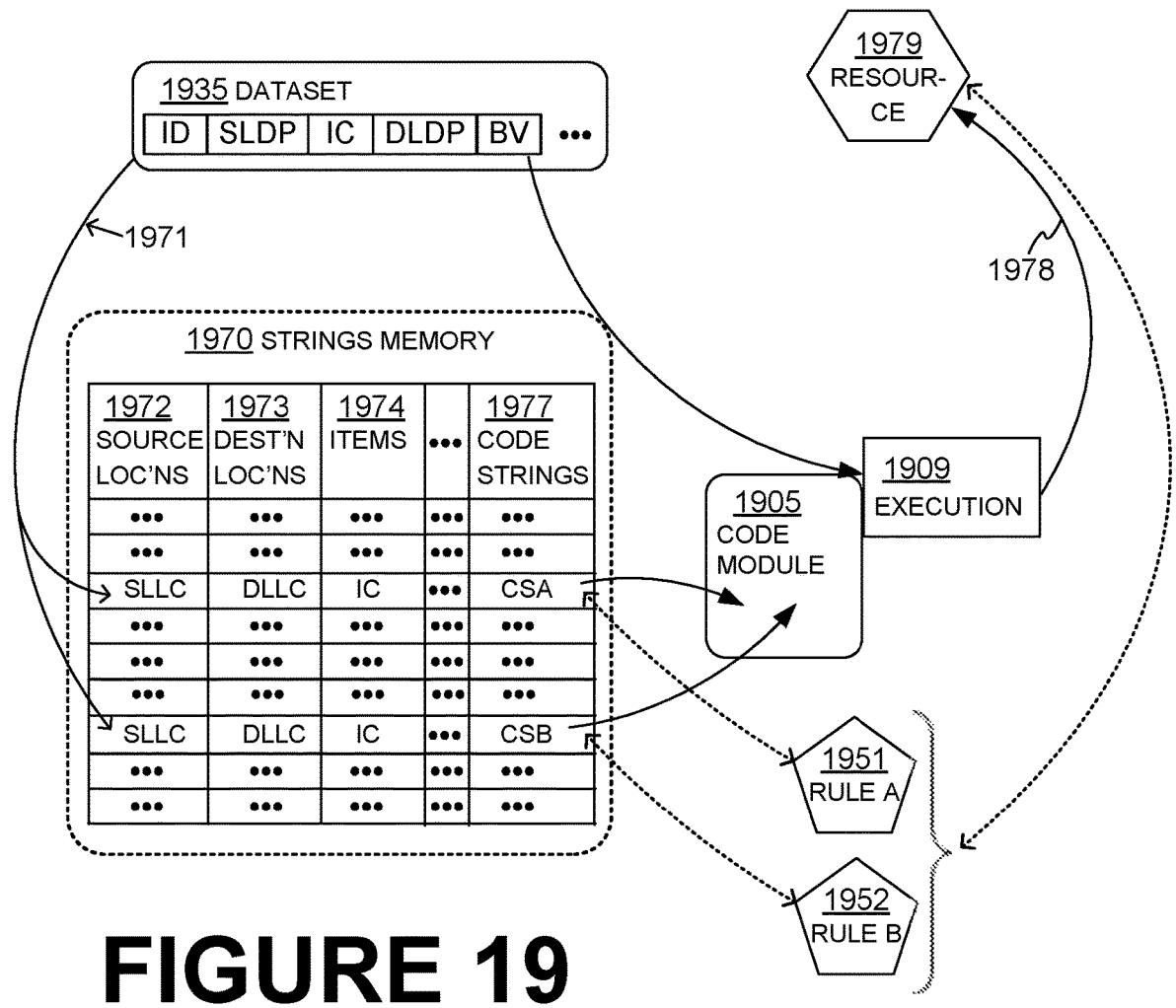
FIG. 19 is a diagram of sample interactions for producing a resource according to embodiments.

FIG. 19 is a diagram showing a dataset 1935 that can be as the dataset 135, and a strings memory 1970 that can largely be as the strings memory 170. The strings memory 1970 is shown here as a table that has a column 1972 for possible source locations, a column 1973 for possible destination locations, a column 1974 for possible items, other possible columns as shown by the dot-dot-dots, and a column 1977 for possible code strings.

A query is generated from the dataset 1935 and, according to the splitting arrow 1971, the query finds two rows that meet its criteria in this example. The first of these rows yields a code string CSA, and the second of these rows yields a second code string CSB. The code string CSA implements a first rule A 1951, and the second code string CSB implements a second rule B 1952.

In such embodiments, the first code module can be generated also from the second code string, and the first resource complies also with the second rule. For instance, in FIG. 19 a code module 1905 is shown as generated also from the second code string CSB, the code module 1905 is again executed by an execution block 1909 to produce a resource 1979 according to arrow 1978, and the resource 1979 complies also with the second rule B 1952. Here, for example the first rule could be that the resource include at least 6.5% of the base value, and the second rule could be that the resource include at least 1% of the base value.

In such embodiments, the first code module can be generated from a first code kernel of the first code string and also from a second code kernel of the second code string. In fact, the first code module can be generated from a first code kernel of the first code string, from a plus sign, and from a second code kernel of the second code string. An example is now described.

Figure 20:
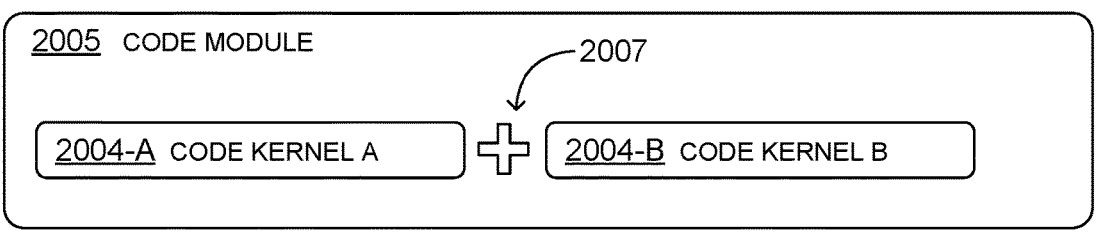
FIG. 20 is a diagram for showing the generation of a code module from two code strings according to embodiments.

FIG. 20 is a diagram for showing the generation of a code module 2005, which can be the code module 1905. The code module 2005 is generated from a code kernel A 2004-A of a first code string (such as code string CSA), from a plus sign 2007, and from a code kernel B 2004-B of a second code string (such as code string CSB). The plus sign 2007 can be concatenated to effectuate a composite instruction where the results of different instructions are added.

The embodiment of FIG. 20 requires that, once a row is found by arrow 1971, search continues until at least another row is found. Moreover, in some instances the resource 1979 may show no attribution of its components from the individual code strings CSA, CSB. Other embodiments are now described, which permit such attribution.

In embodiments, after looking up a second code string from the code strings, the first code module is not generated also from the second code string. Rather, the computer system can be further configured to produce, by executing a second code module that is generated from the second code string, a second resource that complies with the second rule. Again, the executing can be in conjunction with the base value. The computer system can be further configured to sum a numerical value of the first resource and a numerical value of the second resource to produce a composite resource. In such cases, the notification can be about an aspect of the composite resource instead of about an aspect of the first resource. An example is now described.

Figure 21:
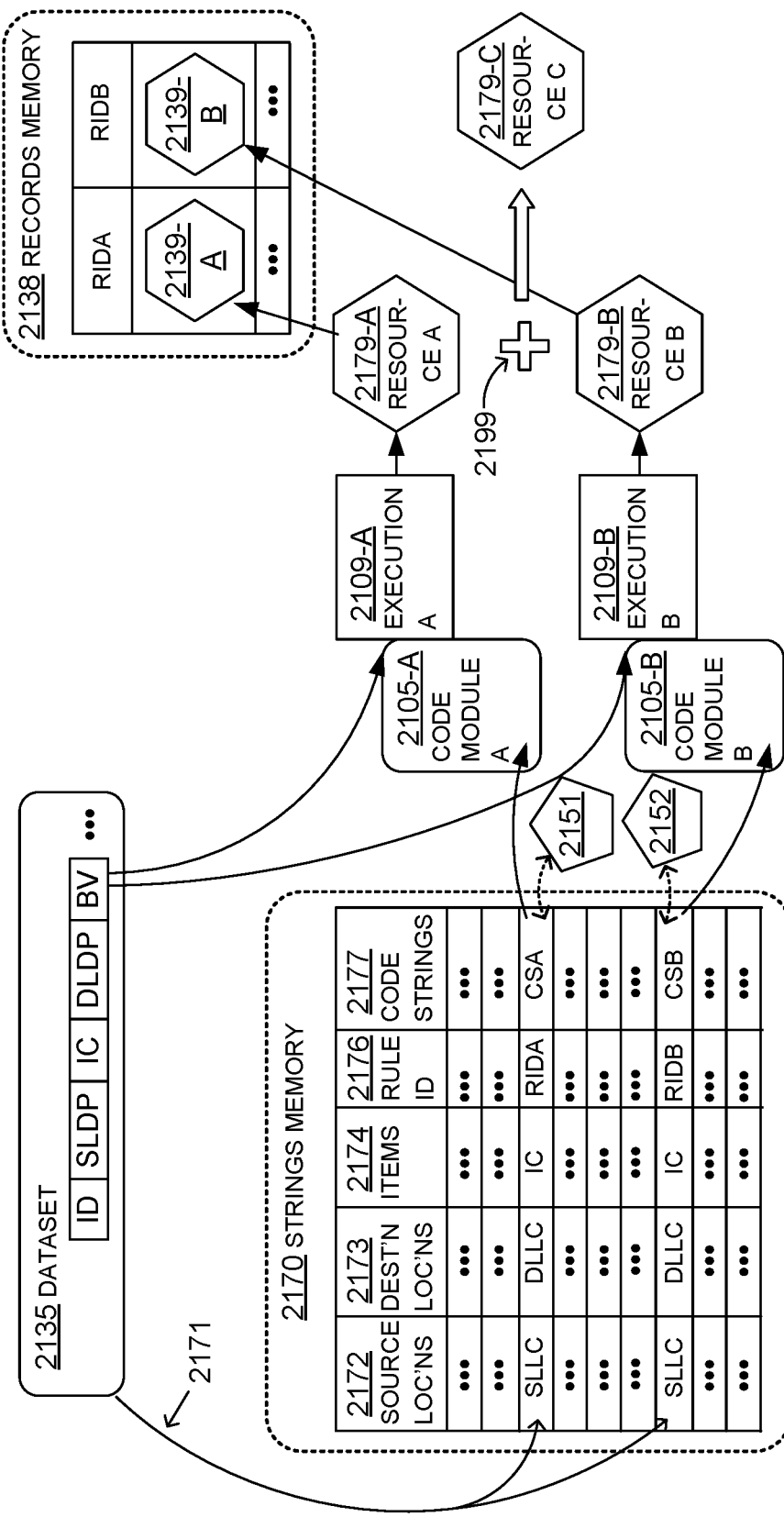
FIG. 21 is a diagram of other sample interactions for producing a resource according to embodiments.

FIG. 21 is a diagram showing a dataset 2135 that can be as the dataset 135, and a strings memory 2170 that can largely be as the strings memory 170. The strings memory 2170 is shown here as a table that has a column 2172 for possible source locations, a column 2173 for possible destination locations, a column 2174 for possible items, an optional column 2176 for possible rule ids, other possible columns (not shown), and a column 2177 for possible code strings. When implemented, a rule id is a code that is stored in association with the code string, and may identify an aspect of the rule that the code string implements. Rule ids may thus be stored with each row. Or, equivalently, different strings memories may be provided, one per rule, and so on.

Similarly with FIG. 19, a query is generated from the dataset 2135 and, according to the splitting arrow 2171, the query finds two rows that meet its criteria in this example. The first of these rows yields a first code string CSA, and the second of these rows yields a second code string CSB. The first code string CSA implements a first rule 2151, and the second code string CSB implements a second rule 2152.

Differently from FIG. 19, however, in the example of FIG. 21 a first code module A 2105-A is generated from the first code string CSA, and a second code module B 2105-B is generated from the first code string CSB. A first execution A block 2109-A executes the first code module A 2105-A to produce a resource A 2179-A. A second execution B block 2109-B executes the second code module B 2105-B to produce a second resource B 2179-B. A numerical value of the resource A 2179-A and a numerical value of the second resource B 2179-B can be summed per an addition operation 2199 to produce a composite resource C 2179-C.

In such embodiments, the individual resources may be stored, for instance in one or more records memories. In particular, the computer system can be further configured to store the first resource in the records memory in association with the first rule, and also store the second resource in the records memory in association with the second rule, and so on with additional possible resources from a single query.

For example, in some embodiments the strings memory may further store, in association with the first code string, a first rule id that identifies an aspect of the first rule, and a second rule id that identifies an aspect of the second rule. In such embodiments, the computer system can be further configured to store the first resource in the records memory in association with the first rule id, and store the second resource in the records memory in association with the second rule id.

In the example of FIG. 21, a first rule id RIDA identifies the first rule 2151, and is stored in association with the first code string CSA. Also, a second rule id RIDB identifies the second rule 2152, and is stored in association with the second code string CSB. A records memory 2138 is provided for storing the individual resources, before they are summed. The computer system can therefore be further configured to store the resource 2139-A in association with the first rule id RIDA, and store the second resource 2139-B in association with the second rule id RIDB.

Figure 22:
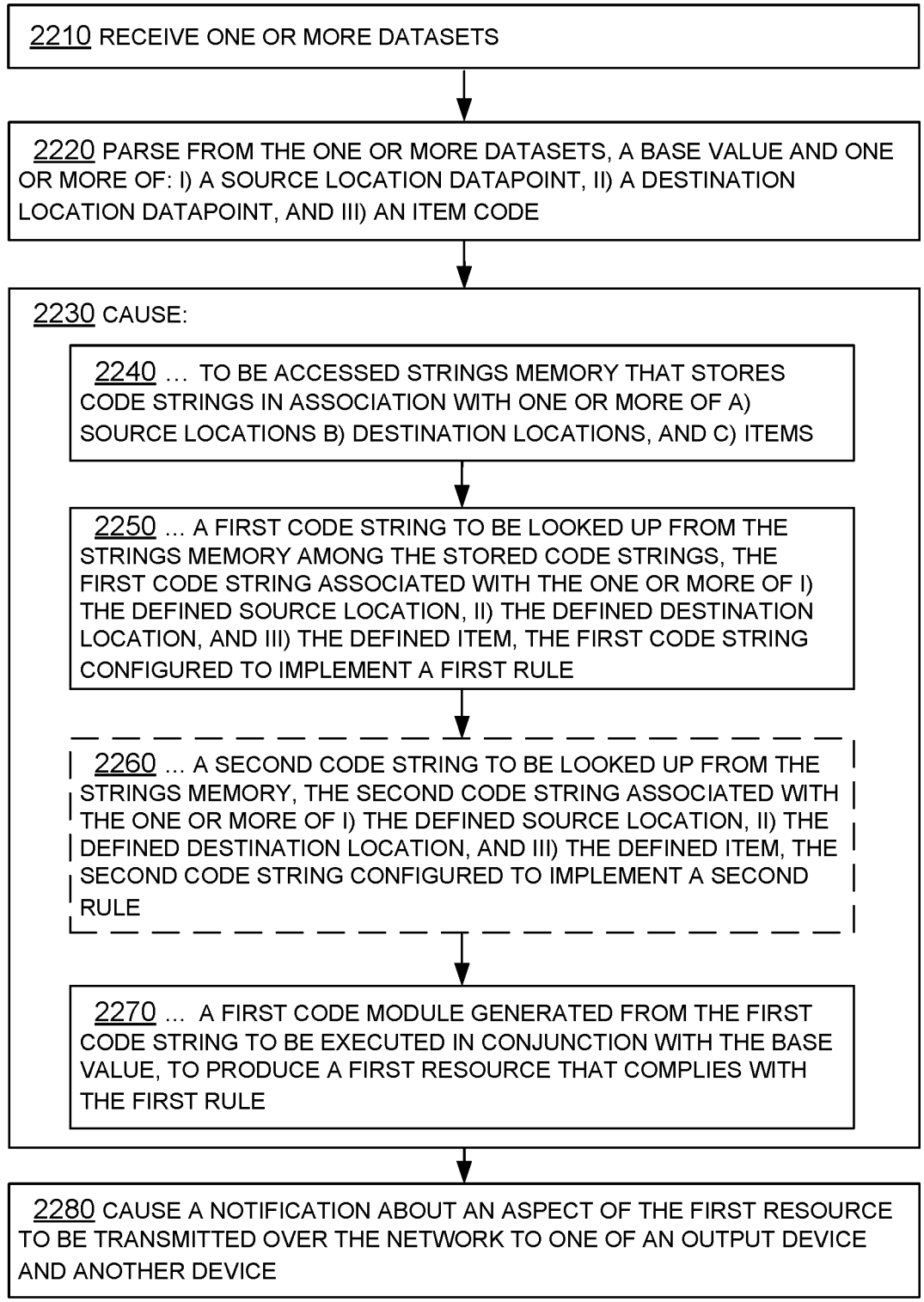
FIG. 22 is a flowchart for illustrating sample methods according to embodiments.

FIG. 22 shows a flowchart 2200 for describing methods according to embodiments. These methods may be implemented as described above, e.g., by computer system, and with the variations and additions described above.

According to an operation 2210, one or more datasets may be received by a computer system over a network. The one or more datasets may be received from a first remote computer different from the computer system.

According to another operation 2220, from the one or more datasets there may be parsed: a base value and one or more of: i) a source location datapoint that defines a source location within a domain that has at least two dimensions, ii) a destination location datapoint that defines a destination location within the domain, and iii) an item code that defines an item from a set of items.

According to another operation 2230, in response to the one or more datasets received at the operation 2210, a number of sub-operations can be caused to be performed. These can be caused to be performed by the computer system itself internally within its online software platform. Or, these can be caused to be performed by the computer system causing a remote support computer 1147-A, 1147-B, 1147-C, which may be hosted by a remote strings memory host platform to execute them, by crafting and sending an appropriately created lookup query 1061, 1161-A, 1161-B, 1161-C, or using other equivalent architecture.

The operation 2230 includes a sub-operation 2240, according to which a strings memory may be caused to be accessed. The strings memory may store code strings in association with one or more of a) one or more source locations of the domain, b) one or more destination locations of the domain, and c) one or more items associated with the source locations and with the destination locations. Accessing may be local or remote, as per the above.

The operation 2230 also includes a sub-operation 2250, according to which a first code string among the stored code strings may be caused to be looked up from the strings memory accessed at the operation 2240. The first code string may be looked up in association with the one or more of the dataset's: i) defined source location, ii) defined destination location, and iii) defined item. The first code string may be configured to implement a first rule about the one or more of the i) the defined source location, ii) the defined destination location, and iii) the defined item transitioning from the defined source location and/or to the defined destination location.

The operation 2230 optionally also includes a sub-operation 2260, according to which a second code string among the stored code strings may be caused to be looked up from the strings memory. The second code string may be associated with the one or more of i) the defined source location, ii) the defined destination location, and iii) the defined item. The second code string may be configured to implement a second rule about the one or more of the dataset's: i) defined source location, ii) defined destination location, and iii) defined item transitioning from the defined source location and/or to the defined destination location. The second rule can be distinct from the first rule. In some of these embodiments, the computer system may cause a second code module, which is generated from the second code string, to be executed, the executing in conjunction with the base value, the executing producing a second resource that complies with the second rule, and so on.

The operation 2230 may further include a sub-operation 2270, according to which a first code module generated from the first code string, which was caused to be looked up at the sub-operation 2250, may be caused to be executed by the computer system. The executing may be performed in conjunction with the base value. The executing may produce a first resource that complies with the first rule. This operation may be different if the optional operation 2260 has also been performed, as per the above.

According to another operation 2280, a notification about an aspect of the first resource can be caused to be transmitted over the network, to one of an output device and another device. This operation may be different if the optional operation 2260 has also been performed, as per the above.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

Details about Computer Systems

Figure 23:
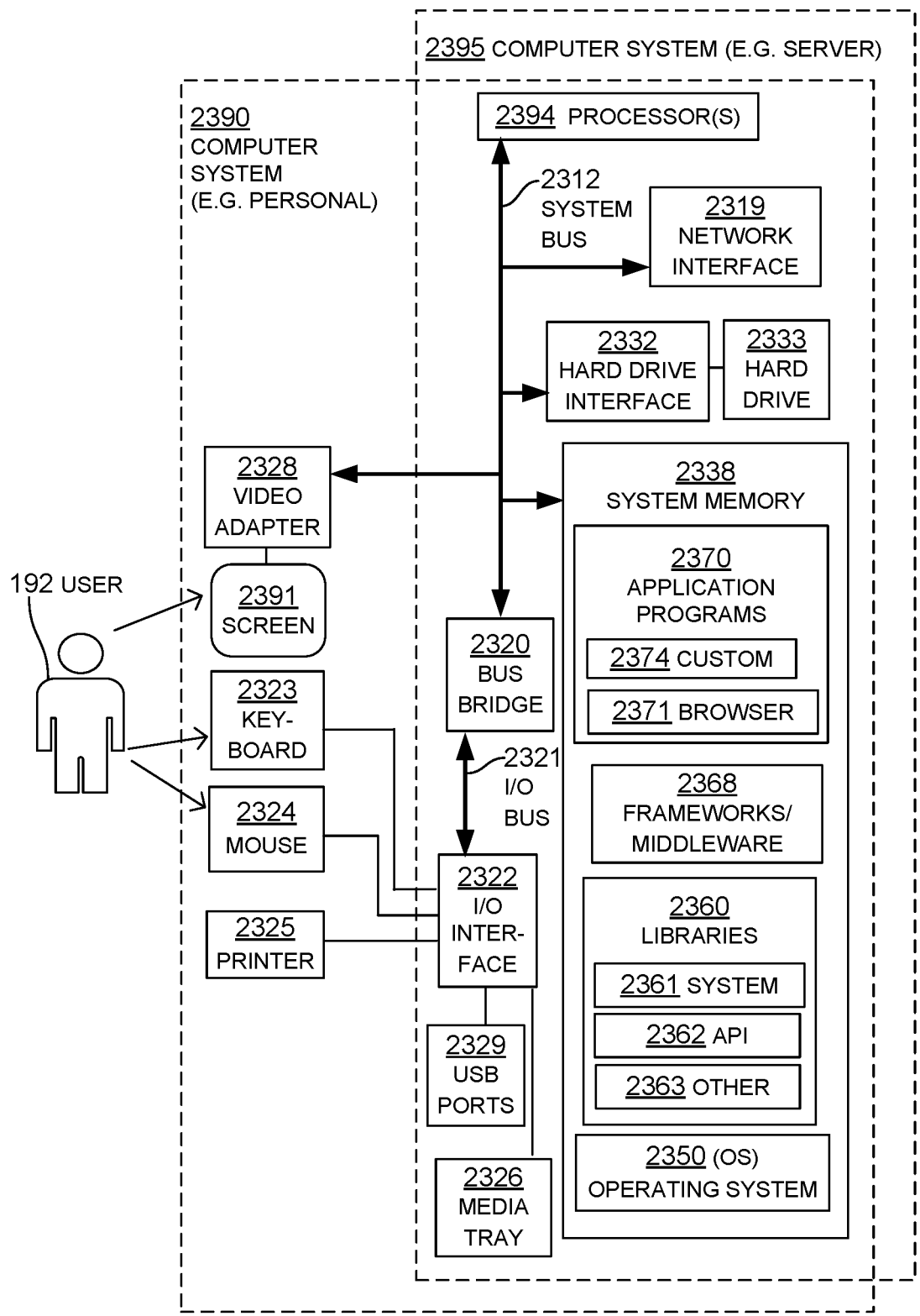
FIG. 23 is a block diagram showing additional components of sample computer systems according to embodiments.

FIG. 23 shows details for a sample computer system 2395 and for a sample computer system 2390. The computer system 2395 may be a server, while the computer system 2390 may be a personal device, such as a personal computer, a desktop computer, a personal computing device such as a laptop computer, a tablet computer, a mobile phone, and so on. Either type may be used for the computer system 195 and 190 of FIG. 1, and/or a computer system that is part of OPF 189.

The computer system 2395 and the computer system 2390 have similarities, which FIG. 23 exploits for purposes of economy in this document. It will be understood, however, that a component in the computer system 2395 may be implemented differently than the same component in the computer system 2390. For instance, a memory in a server may be larger than a memory in a personal computer, and so on. Similarly, custom application programs 2374 that implement embodiments may be different, and so on.

The computer system 2395 includes one or more processors 2394. The processor(s) 2394 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 2394 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 2395, or the computer system 2390, are not intended to be exhaustive. Rather, they are representative, for highlighting essential components that can be used with embodiments.

The computer system 2395 also includes a system bus 2312 that is coupled to the processor(s) 2394. The system bus 2312 can be used by the processor(s) 2394 to control and/or communicate with other components of the computer system 2395.

The computer system 2395 additionally includes a network interface 2319 that is coupled to system bus 2312. Network interface 2319 can be used to access a communications network, such as the network 188. Network interface 2319 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 2395 also includes various memory components. These memory components include memory components shown separately in the computer system 2395, plus cache memory within the processor(s) 2394. Accordingly, these memory components are examples of non-transitory machine-readable media. The memory components shown separately in the computer system 2395 are variously coupled, directly or indirectly, with the processor(s) 2394. The coupling in this example is via the system bus 2312.

Instructions for performing any of the methods or functions described in this document may be stored, completely or partially, within the memory components of the computer system 2395, etc. Therefore, one or more of these non-transitory computer-readable media can be configured to store instructions which, when executed by one or more processors 2394 of a host computer system such as the computer system 2395 or the computer system 2390, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 2395 include a non-volatile hard drive 2333. The computer system 2395 further includes a hard drive interface 2332 that is coupled to the hard drive 2333 and to the system bus 2312.

The memory components of the computer system 2395 include a system memory 2338. The system memory 2338 includes volatile memory including, but not limited to, cache memory, registers and buffers. In embodiments, data from the hard drive 2333 populates registers of the volatile memory of the system memory 2338.

In some embodiments, the system memory 2338 has a software architecture that uses a stack of layers, with each layer providing a particular functionality. In this example the layers include, starting from the bottom, an Operating System (OS) 2350, libraries 2360, frameworks/middleware 2368 and application programs 2370, which are also known as applications 2370. Other software architectures may include less, more or different layers. For example, a presentation layer may also be included. For another example, some mobile or special purpose operating systems may not provide a frameworks/middleware 2368.

The OS 2350 may manage hardware resources and provide common services. The libraries 2360 provide a common infrastructure that is used by the applications 2370 and/or other components and/or layers. The libraries 2360 provide functionality that allows other software components to perform tasks more easily than if they interfaced directly with the specific underlying functionality of the OS 2350. The libraries 2360 may include system libraries 2361, such as a C standard library. The system libraries 2361 may provide functions such as memory allocation functions, string manipulation functions, mathematical functions, and the like.

In addition, the libraries 2360 may include API libraries 2362 and other libraries 2363. The API libraries 2362 may include media libraries, such as libraries to support presentation and manipulation of various media formats such as MPREG4, H.264, MP3, AAC, AMR, JPG, and PNG. The API libraries 2362 may also include graphics libraries, for instance an OpenGL framework that may be used to render 2D and 3D in a graphic content on the screen 2391. The API libraries 2362 may further include database libraries, for instance SQLite, which may support various relational database functions. The API libraries 2362 may additionally include web libraries, for instance WebKit, which may support web browsing functionality, and also libraries for applications 2370.

The frameworks/middleware 2368 may provide a higher-level common infrastructure that may be used by the applications 2370 and/or other software components/modules. For example, the frameworks/middleware 2368 may provide various Graphic User Interface (GUI) functions, high-level resource management, high-level location services, and so forth. The frameworks/middleware 2368 may provide a broad spectrum of other APIs that may be used by the applications 2370 and/or other software components/modules, some of which may be specific to the OS 2350 or to a platform.

The application programs 2370 are also known more simply as applications and apps. One such app is a browser 2371, which is a software that can permit the user 192 to access other devices in the internet, for example while using a Graphic User Interface (GUI). The browser 2371 includes program modules and instructions that enable the computer system 2395 to exchange network messages with a network, for example using Hypertext Transfer Protocol (HTTP) messaging.

The application programs 2370 may include one or more custom applications 2374, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 2370 may include a contacts application, a book reader application, a location application, a media application, a messaging application, and so on. Applications 2370 may be developed using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 2370 may use built-in functions of the OS 2350, of the libraries 2360, and of the frameworks/middleware 2368 to create user interfaces for the user 192 to interact with.

The computer system 2395 moreover includes a bus bridge 2320 coupled to the system bus 2312. The computer system 2395 furthermore includes an input/output (I/O) bus 2321 coupled to the bus bridge 2320. The computer system 2395 also includes an I/O interface 2322 coupled to the I/O bus 2321.

For being accessed, the computer system 2395 also includes one or more Universal Serial Bus (USB) ports 2329. These can be coupled to the I/O interface 2322. The computer system 2395 further includes a media tray 2326, which may include storage devices such as CD-ROM drives, multi-media interfaces, and so on.

The computer system 2390 may include many components similar to those of the computer system 2395, as seen in FIG. 23. In addition, a number of the application programs may be more suitable for the computer system 2390 than for the computer system 2395.

The computer system 2390 further includes peripheral input/output (I/O) devices for being accessed by a user more routinely. As such, the computer system 2390 includes a screen 2391 and a video adapter 2328 to drive and/or support the screen 2391. The video adapter 2328 is coupled to the system bus 2312.

The computer system 2390 also includes a keyboard 2323, a mouse 2324, and a printer 2325. In this example, the keyboard 2323, the mouse 2324, and the printer 2325 are directly coupled to the I/O interface 2322. Sometimes this coupling is via the USB ports 2329.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 2394.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all of these aspects have even similar reference numerals.)

Operational examples and sample use cases are possible where the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

FIG. 24 is diagram for an operational example and use case where the resource is a tax obligation 2479 of a primary entity 2493 and/or a secondary entity 2496, due to a sale transaction 2497. The transaction 2497 is an example of a relationship instance between the primary entity 2493 and the secondary entity 2496.

The primary entity 2493 is a seller that has a source location 2457 in a geographic domain 2401. The source location 2457 indicates where the seller is, or is shipping from. The seller is selling an item 2408 to the secondary entity 2496 as the buyer. The secondary entity 2496 has a destination location 2458 that indicates where the buyer is at, and/or where the item 2408 is being shipped to.

It will be recognized that aspects of FIG. 24 have similarities with aspects of FIG. 1. Portions of such aspects may be implemented as described for analogous aspects of FIG. 1. In particular, a thick line 2415 separates FIG. 24, although not completely or rigorously, into a top portion and a bottom portion. Above the line 2415 the emphasis is mostly on entities, components, their relationships, and their interactions, while below the line 2415 the emphasis is mostly processing of data that takes place often within one or more of the components above the line 2415.

Above the line 2415, a computer system 2495 is shown, which is used to help customers, such as a user 2492, with tax compliance. Further in this example, the computer system 2495 is part of an OSP 2498 that is implemented as a Software as a Service (SaaS) provider, for being accessed by the user 2492 online. Alternately, the functionality of the computer system 2495 may be provided locally to a user.

The user 2492 may be standalone. The user 2492 may use a computer system 2490 that has a screen 2491. In embodiments, the user 2492 and the computer system 2490 are considered part of the primary entity 2493, which is also known as entity 2493. The primary entity 2493 can be a business, such as a seller of items, a reseller, a buyer, and so on. In such instances, the user 2492 can be an employee, a contractor, or otherwise an agent of the entity 2493. In use cases the entity 2493 is a seller, the secondary entity 2496 is a buyer, and together they are performing the buy-sell transaction 2497. The buy-sell transaction 2497 may involve an operation, such as an exchange of data to form an agreement. This operation can be performed in person, or over the network 188, etc. In such cases the entity 2493 can even be an online seller, but that is not necessary. The transaction 2497 will have data that is known to the entity 2493, similarly with what was described by the relationship instance 197 of FIG. 1.

In a number of instances, the user 2492 and/or the entity 2493 use software applications to manage their business activities, such as sales, resource management, production, inventory management, delivery, billing, and so on. The user 2492 and/or the entity 2493 may further use accounting applications to manage purchase orders, sales invoices, refunds, payroll, accounts payable, accounts receivable, and so on. Such software applications, and more, may be used locally by the user 2492, or from an Online Processing Facility (OPF) 2489 that has been engaged for this purpose by the user 2492 and/or the entity 2493. In such use cases, the OPF 2489 can be a Mobile Payments system, a Point Of Sale (POS) system, an accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. As the United States switched, largely but not completely, from primarily origin-based sales tax to destination-based tax, the number of tax jurisdictions rapidly multiplied, and the incentives for local governments to implement new and varied tax rules and ever smaller jurisdictions multiplied. As such, there are over 10,000 different tax jurisdictions in the US, with many partially overlapping, and with sizes varying from many square miles to as small as a single building. In parallel, tens of thousands of tax rules and tax rates have been developed.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be hard to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Lastly, even where a seller might not have reached any of the thresholds for economic nexus, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

To help with such complex determinations, the computer system 2495 may be specialized for tax compliance. The computer system 2495 may have one or more processors and memory, for example as was described for the computer system 195 of FIG. 1. The computer system 2495 thus implements a tax engine 2483 to make the determinations of tax obligations. The tax engine 2483 can be as described for the service engine 183, and with suitable adjustments and augmentations.

The computer system 2495 may further store locally entity data, i.e., data of user 2492 and/or of entity 2493, either of which/whom may be a customer, and/or a seller or a buyer in a sales transaction. The entity data may include profile data of the customer, and transaction data from which a determination of a tax obligation is desired. In the online implementation of FIG. 24, the OSP 2498 has a database 2494 for storing the entity data. This entity data may be inputted by the user 2492, and/or caused to be downloaded or uploading by the user 2492 from the computer system 2490 or from the OPF 2489, or extracted from the computer system 2490 or from OPF 2489, and so on. In other implementations, a simpler memory configuration may suffice for storing the entity data.

A digital tax content 2486 is further implemented within the OSP 2498. The digital tax content 2486 can be implemented by a strings memory for tax rules 2470 for use by the tax engine 2483. Some or all of the digital tax content 2486, including the strings memory for tax rules 2470, may be implemented locally within the OSP 2498, or be hosted remotely, to a separate strings memory host platform. As part of managing the digital tax content 2486, there may be continuous updates of the digital tax rules, by inputs gleaned from a set 2480 of different tax authorities 2481, 2482, . . . . Updating may be performed by humans, or by computers, and so on. As mentioned above, the number of the different tax authorities in the set 2480 may be very large.

For a specific determination of a tax obligation, the computer system 2495 may receive one or more datasets. A sample received dataset 2435 is shown just below line 2415, which can be similar to what was described for the dataset 135 of FIG. 1. Its values SLDP, DLDP can correspond to the source location 2457 and to the destination location 2458 according to arrows 2411. In this example, the computer system 2490 transmits a request 2484 that includes a payload 2434, and the dataset 2435 is received by the computer system 2495 parsing the received payload 2434. In this example the single payload 2434 encodes the entire dataset 2435, but that is not required, as mentioned earlier.

In this example, the dataset 2435 has been received because it is desired to determine any tax obligations arising from the buy-sell transaction 2497. As such, the sample received dataset 2435 has values that characterize attributes of the buy-sell transaction 2497, as indicated by arrows 2499 in combination with arrows 2411. (It should be noted that these arrows combinations describe correspondences, but not the journey of the data of the buy-sell transaction 2497 in becoming the received dataset 2435.) Accordingly, in this example the sample received dataset 2435 has a value ID for an identity of the dataset 2435 and/or the transaction 2497. The dataset 2435 also has a value SLDP as the source location datapoint for the source location 2457, a value DLDP as the destination location datapoint for the destination location 2458, an item code IC about the item, a value BV for the purchase price of the item 2408, and other values. These other values may include the name of the primary entity 2493 or the user 2492, which can be the seller making sales transactions, some online. These other values may include relevant data of the primary entity 2493 or the user 2492, such as an address, place(s) of business, prior nexus determinations with various tax jurisdictions, and so on. These other values may include parallel data for the secondary entity 2496, which can be the buyer, plus data such as whether the secondary entity 2496 has entity-driven exemption status, and so on. The dataset 2435 may further have additional values, as indicated by the dot-dot-dot in the right side of the dataset 2435. These values may characterize further attributes, such as what item was sold, for example by a Stock Keeping Unit (SKU), how many units of the item were sold, a date and possibly also time of the transaction 2497, and so on.

For item codes, the Harmonized System Code or HSCode may be used. The system is used by many economies around the world as a basis for their customs tariffs and for the collection of international trade statistics. Over 98% of the merchandise in international trade is classified in terms of the HS. Through its contribution to the harmonization of customs and trade procedures, the HS code reduces the costs related to international trade, as it eliminates the need for a "translator" for people to read and understand this code. We can take the HS code 1704.90.10.00 as an example:

17 relates to Chapter 17 of Section IV—Prepared foodstuffs; beverages, spirits, and vinegar; tobacco and manufactured tobacco substitutes;

04 relates to sugar confectionery (including white chocolate), not containing cocoa;

90 relates to confections or sweetmeats ready for consumption; and 10.00 relates to candied nuts.

Accordingly, the HS code 1704.90.10.00 means candied nuts, for many countries.

For the purposes of this document, the importance of HSCODES is that all products and services sold can be reduced to one of a few thousand categories necessary to determine the tax and that category can be expressed as a short alphanumeric character string. It is not necessary to store a database of all potential items (think UPC codes) and their tax rules. Simply storing the rules by category is sufficient.

In the example of FIG. 24, the strings memory for tax rules 2470 may be populated by columns such as a column 2472 for possible source locations, a column 2473 for possible destination locations, a column 2474 for possible items, other columns as indicated by the dot-dot-dot, and a code strings column 2477 for code strings such as those shown earlier in this document. While these are shown as separate columns, this is done only for clarity. In fact, in other embodiments, the entries for the possible source locations and the possible destination locations, and also even those for the possible items, may be presented in suitable alphanumeric codes that are even concatenated.

The entries in the strings memory for tax rules 2470 accommodate seller-and-buyer locations pair-wise, for determining the sales tax whether it is to be applied for origin-based or destination-based jurisdictions. By including the items, the sales tax can be overridden for diverse taxability of individual items, for temporary tax holidays, for exemptions from having to pay sales tax based on who the buyer is, and also based on nexus, and so on. The domain 2401 is selected to includes both the source location 2457 and the destination location 2458. For instance, in a sale by a seller Illinois to a buyer in Alabama, the domain 2401 can be the US, with its sales tax rules about origin and destination, and so on. In some applications, some tax rules include all possible destination locations given a source location. In some applications, some tax rules include all possible source locations given a destination location.

In the example of FIG. 24, when the dataset 2435 is parsed, a query is formed in terms of a source location lookup code SLLC that matches the source location datapoint SLDP, a destination location lookup code DLLC that matches the source location datapoint DLDP, and maybe even an item lookup code ILC that matches the item IC. The query looks up and finds, per the arrow 2471, a row with the source location lookup code SLLC, the destination location lookup code DLLC, and maybe even the item lookup code ILC, and which therefore looks up a code string CA that is configured to implement a tax Rule A 2451.

The code string CA implements, when executed, the sales tax or use tax owed due to the transaction 2497 at a certain percentage of the purchase price, per the tax rules that the set 2480 of different tax authorities 2481, 2482 . . . promulgate within the boundaries of their tax jurisdictions. There may be additional code strings, for example as shown in FIGS. 19, 21, for instance where, for a single transaction, there are sales taxes from multiple jurisdictions, such as the state, the city, the municipality and so on. A code string for the sales tax for the State of Kansas might be: "=BASE_A-

MOUNTx.065", and a code string for the sales tax for Sedgwick County might be: "=BASE_AMOUNTx.01". Someone purchasing from Sedgwick County from outside Kansas would have to pay both. These may be separate code strings, or a single concatenated code string with plus signs. More complex tariffs may be enabled, such as a tariff of: $2.194/kg+10% of purchase price may be expressed in DSL as: "=(USD2.194/WEIGHT)+(BASE_AMOUNTx0.01)"

A code module 2405 may be generated from the code string CA, similarly as the above. For instance, the looked-up code string CSA may be returned to the computer system 2495 according to an arrow 2441, locally or through a cloud, and so on. The code module 2405 may be executed per an execution block 2409 to produce, per the arrow 2478, a tax obligation 2479. The tax obligation 2479 will comply with Rule A 2451. As such, the tax obligation 2479 is akin to producing the resource 179 of FIG. 1.

There could be two taxes due, similarly with FIG. 21. These can be recorded in separate memories, for audit purposes.

The computer system 2495 may then cause a notification 2436 to be transmitted. The notification 2436 can be about an aspect of the tax obligation 2479, similarly with the notification 136 of FIG. 1. In the example of FIG. 24, the notification 2436 is caused to be transmitted by the computer system 2495 as an answer to the received dataset 2435. The notification 2436 can be about an aspect of the tax obligation 2479. In particular, the notification 2436 may inform about the aspect of the tax obligation 2479, namely that it has been determined, where it can be found, what it is, or at least a portion or a statistic of its content, and so on.

The notification 2436 can be transmitted to one of an output device and another device that can be the remote device, from which the dataset 2435 was received. The output device maybe the screen of a local user or a remote user. The notification 2436 may thus cause a desired image to appear on the screen, such as within a Graphical User Interface (GUI) and so on. The other device may be a remote device, as in this example. In particular, the computer system 2495 causes the notification 2436 to be communicated by being encoded as a payload 2437, which is carried by a response 2487. The response 2487 may be transmitted via the network 188 responsive to the received request 2484. The response 2487 may be transmitted to the computer system 2490, or to OPF 2489, and so on. As such, the other device can be the computer system 2490, or a device of the OPF 2489, or the screen 2491 of the user 2492, and so on. In this example the single payload 2437 encodes the entire notification 2436, but that is not required, similarly with what is written above about encoding datasets in payloads. Of course, along with the aspect of the tax obligation 2479, it is advantageous to embed in the payload 2437 the ID value and/or one or more values of the dataset 2435. This will help the recipient correlate the response 2487 to the request 2484, and therefore match the received aspect of the tax obligation 2479 as the answer to the received dataset 2435.

The tax information in the strings memory for tax rules 2470 could be updated by: a) beginning with a first information that is reflected on data structure, b) receiving additional information, c) identifying the affected row (parent row), d) breaking up the parent row to smaller ones (children rows), each child row initially having the parent row's information, and e) updating only some but not all of the children rows with the additional information.

FIG. 25 shows a flowchart 2500 for describing methods according to embodiments, for the use case of where producing the resource is computing the sales tax. These methods may be implemented as described above, e.g., by a computer system, and with the variations and additions described above, and also adapted further to sales transactions and sales tax.

According to an operation 2510, a dataset is received from a seller, their device, and so on. The dataset represents a sales transaction, and could be as described for the dataset 2435.

According to another operation 2520, from the received datasets there may be parsed: a base value and i) a seller location, ii) a buyer location, and iii) an item. The locations can be parsed from respective datapoints, and so on.

According to another operation 2530, in response to the dataset received at the operation 2510, a number of sub-operations can be caused to be performed. These can be caused to be performed by the computer system itself internally within its online software platform. Or, these can be caused to be performed by the computer system causing a remote support computer to execute them.

The operation 2530 may include a sub-operation 2540, according to which a strings memory may be caused to be accessed. The strings memory can be as the strings memory for tax rules 2470.

The operation 2530 may also include a sub-operation 2550, according to which a code string may be looked up from the strings memory accessed at the operation 2540. The code string may be looked up in association with i) the seller location, ii) the buyer location, and iii) the item. The code string may be configured to implement a sales tax rule about i) the seller location, ii) the buyer location, and iii) the item being sold from the seller location to the buyer location.

The operation 2530 may further include a sub-operation 2570, according to which a sales tax that complies with the sales tax rule may be caused to be computed, by a computer system executing the code string looked up at the sub-operation 2550. The executing may be performed in conjunction with the base value.

According to another operation 2580, a notification about the sales tax can be caused to be transmitted over the network to the seller, their device and so on. The notification can be used to add the sales tax to the cost (base value) of the transaction.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112(f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112(f).

What is claimed is:

1. A computer system including at least:
one or more processors; and
a non-transitory computer-readable storage medium having stored thereon instructions which, when executed by the one or more processors, result in operations including at least:
receiving, by the computer system over a network from a first remote computer different from the computer system, one or more datasets;
parsing, by the computer system from the one or more datasets, a base value and one or more of: i) a source location datapoint that defines a source location within a domain that has at least two dimensions, ii) a destination location datapoint that defines a destination location within the domain, and iii) an item code that defines an item from a set of items;
causing, by the computer system, in response to the received one or more datasets:
a) a strings memory to be accessed, in which the strings memory stores code strings in association with one or more of: i) one or more source locations of the domain, ii) one or more destination locations of the domain, and iii) one or more items associated with the one or more source locations of the domain and with the one or more destination locations of the domain,
b) a first code string to be looked up from the code strings stored in the strings memory, in which the first code string is looked up in association with one or more of: i) the defined source location, ii) the defined destination location, and iii) the defined item, and in which the first code string is configured to implement a first rule of the domain about the one or more of: i) the defined source location, ii) the defined destination location, and iii) the defined item transitioning from the defined source location and/or to the defined destination location, and
c) a first code module that is generated from the first code string to be executed, in which the executing is in conjunction with the base value, and in which the executing produces a first resource that complies with the first rule of the domain; and
causing, by the computer system, a notification about an aspect of the first resource to be transmitted over the network to one of an output device and another device.

2. The computer system of claim 1, in which:
the domain is geographic.

3. The computer system of claim 1, in which:
the domain has three dimensions.

4. The computer system of claim 1, in which:
at least one of the source location datapoint and the destination location datapoint includes a street address.

5. The computer system of claim 1, in which:
at least one of the source location datapoint and the destination location datapoint includes a latitude and a longitude.

6. The computer system of claim 1, in which:
at least one of the source location datapoint and the destination location datapoint is a location lookup code.

7. The computer system of claim 1, in which the operations further include:
detecting, by the computer system from the one or more datasets, an indication about a length of the source location datapoint; and
the parsing is performed according to the detected indication.

8. The computer system of claim 1, in which:
the looking up is performed by applying to the strings memory the parsed one or more of: i) the source location datapoint and ii) the destination location datapoint.

9. The computer system of claim 1, in which:
the looking up is performed by applying to the strings memory the parsed one or more of: i) the source location datapoint, ii) the destination location datapoint, and iii) the item code.

10. The computer system of claim 1, in which the operations further include:
converting, by the computer system, at least one of the source location datapoint and the destination location datapoint into a location lookup code; and
the first code string is looked up by the location lookup code.

11. The computer system of claim 10, in which:
at least one of the source location datapoint and the destination location datapoint includes a latitude and a longitude.

12. The computer system of claim 10, in which:
at least one of the source location datapoint and the destination location datapoint includes a street address.

13. The computer system of claim 10, in which:
the converting includes adding one or more characters to the at least one of the source location datapoint and the destination location datapoint.

14. The computer system of claim 1, in which:
the strings memory is hosted by a strings memory host platform remote from an online software platform that hosts the computer system; and
causing the strings memory to be accessed includes at least:
forming, by the computer system, a lookup query from at least one of a source location lookup code and a destination location lookup code;
causing, by the computer system, the lookup query to be transmitted over a network from the computer system to a support computer that is hosted by the strings memory host platform; and
receiving, by the computer system, the looked up first code string from the support computer.

15. The computer system of claim 1, in which:
the strings memory is hosted by a strings memory host platform remote from an online software platform that hosts the computer system;
causing the strings memory to be accessed includes at least:
forming, by the computer system, a lookup query from at least one of a source location lookup code and a destination location lookup code; and
causing, by the computer system, the lookup query to be transmitted over a network from the computer system to the strings memory host platform for generation of the first code module by a support computer in the strings memory host platform;
the first code module is caused to be generated by causing the support computer to generate the first code module; and
the generated first code module is received by the computer system from the support computer.

16. The computer system of claim 1, in which:
the strings memory is hosted by a strings memory host platform remote from an online software platform that hosts the computer system;
causing the strings memory to be accessed includes at least:
forming, by the computer system, a lookup query from at least one of a source location lookup code and a destination location lookup code; and
causing, by the computer system, the lookup query to be transmitted over a network from the computer system to the strings memory host platform;
the first code module is caused to be generated by causing a support computer hosted by the strings memory host platform to generate the first code module;
causing the first code module to be executed includes causing the support computer to execute the first code module to produce the first resource; and
the produced first resource is received by the computer system from the support computer.

17. The computer system of claim 1, in which:
the strings memory is partitioned according to different source location datapoints.

18. The computer system of claim 1, in which:
the strings memory is partitioned according to different destination location datapoints.

19. The computer system of claim 1, in which:
the strings memory is partitioned according to different item codes.

20. The computer system of claim 1, in which:
the looking up is performed by applying to the strings memory a single query string that is derived by concatenating, in any order, at least two of:
a first query made from the source location datapoint,
a second query made from the destination location datapoint, and
a third query made from the item code.

21. The computer system of claim 1, in which:
the looking up is performed by applying to the strings memory a single query string that is derived by concatenating, in any order, at least two of:
the source location datapoint,
the destination location datapoint, and
the item code.

22. The computer system of claim 1, in which:
the first code module is the first code string.

23. The computer system of claim 1, in which:
the first code module references the base value as a variable.

24. The computer system of claim 1, in which:
the first code module includes a logical "IF" statement.

25. The computer system of claim 1, in which the operations further include:
generating, by the computer system, the first code module from the first code string.

26. The computer system of claim 25, in which:
the first code module is generated from a first code kernel of the first code string.

27. The computer system of claim 26, in which:
the first code kernel is the first code string.

28. The computer system of claim 26, in which:
the first code kernel is a subset of the first code string.

29. The computer system of claim 26, in which:
the first code kernel includes a logical "IF" statement.

30. The computer system of claim 26, in which:
the first code module is generated by further altering the first code kernel.

31. The computer system of claim 26, in which:
the first code module includes the base value as a variable.

32. The computer system of claim 26, in which:
the first code module is executed by a subroutine that calls the base value as a variable.

33. The computer system of claim 1, in which the operations further include:
causing, by the computer system, a second code string to be looked up from the code strings stored in the strings memory, in which the second code string is associated with the one or more of: i) the defined source location, ii) the defined destination location, and iii) the defined item, in which the second code string is configured to implement a second rule of the domain about the one or more of: i) the defined source location, ii) the defined destination location, and iii) the defined item transitioning from the defined source location and/or to the defined destination location, in which the second rule of the domain is distinct from the first rule of the domain, in which the first code module is also generated from the second code string, and in which the first resource also complies with the second rule of the domain.

34. The computer system of claim 33, in which:
the first code module is generated from a first code kernel of the first code string and from a second code kernel of the second code string.

35. The computer system of claim 33, in which:
the first code module is generated from a first code kernel of the first code string, from a plus sign, and from a second code kernel of the second code string.

36. The computer system of claim 1, in which the operations further include:
causing, by the computer system, a second code string to be looked up from the code strings stored in the strings memory, in which the second code string is associated with the one or more of: i) the defined source location, ii) the defined destination location, and iii) the defined item, in which the second code string is configured to implement a second rule of the domain about the one or more of: i) the defined source location, ii) the defined destination location, and iii) the defined item transitioning from the defined source location and/or to the defined destination location, in which the second rule of the domain is distinct from the first rule of the domain;
causing, by the computer system, a second code module that is generated from the second code string to be executed, in which the executing is in conjunction with the base value, and in which the executing produces a second resource that complies with the second rule of the domain;
summing a numerical value of the first resource and a numerical value of the second resource to produce a composite resource; and
in which the notification is about an aspect of the composite resource instead of about an aspect of the first resource.

37. The computer system of claim 36, in which:
the non-transitory computer-readable storage medium includes a records memory, and
the operations further include:
storing, by the computer system, the first resource in the records memory in association with the first rule of the domain; and
storing, by the computer system, the second resource in the records memory in association with the second rule of the domain.

38. The computer system of claim 36, in which:
the non-transitory computer-readable storage medium includes a records memory,
the strings memory further stores, in association with the first code string, a first rule id that identifies an aspect of the first rule,
the strings memory further stores, in association with the second code string, a second rule id that identifies an aspect of the second rule, and
the operations further include:
storing, by the computer system, the first resource in the records memory in association with the first rule id; and
storing, by the computer system, the second resource in the records memory in association with the second rule id.

* * * * *